(12) United States Patent
Bergström et al.

(10) Patent No.: US 12,058,657 B2
(45) Date of Patent: *Aug. 6, 2024

(54) AUTONOMOUS TIMING ADJUSTMENT FOR A WIRELESS DEVICE

(71) Applicant: Telefonaktiebolaget LM Ericsson (publ), Stockholm (SE)

(72) Inventors: Mattias Bergström, Sollentuna (SE); Muhammad Kazmi, Sundbyberg (SE); Iana Siomina, Täby (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 17/972,962

(22) Filed: Oct. 25, 2022

(65) Prior Publication Data

US 2023/0057591 A1 Feb. 23, 2023

Related U.S. Application Data

(63) Continuation of application No. 16/336,973, filed as application No. PCT/IB2017/056074 on Oct. 2, 2017, now Pat. No. 11,497,015.

(Continued)

(51) Int. Cl.
*H04W 72/0446* (2023.01)
*H04W 56/00* (2009.01)
*H04W 72/20* (2023.01)

(52) U.S. Cl.
CPC ... *H04W 72/0446* (2013.01); *H04W 56/0045* (2013.01); *H04W 72/20* (2023.01)

(58) Field of Classification Search
CPC ............. H04W 56/0045; H04W 72/20; H04W 72/0446
See application file for complete search history.

(56) References Cited

U.S. PATENT DOCUMENTS 7,190,691 B2   3/2007   Hwang et al.
9,166,648 B2   10/2015  Shudark et al.
(Continued)

FOREIGN PATENT DOCUMENTS

CN   102036359 A   4/2011
CN   102083197 A   6/2011
(Continued)

OTHER PUBLICATIONS

International Search Report and Written Opinion of the International Searching Authority dated Jan. 18, 2018 and Issued in corresponding PCT Application No. PCT/IB2017/056074, consisting of 10 pages.

(Continued)

*Primary Examiner* — Ajay Cattungal
(74) *Attorney, Agent, or Firm* — Weisberg I.P. Law, P.A.

(57) ABSTRACT

A wireless device and network node are provided. According to one aspect, the wireless device includes processing circuitry configured to determine at least a first timing adjustment parameter based on at least a first numerology parameter and adjust the timing of an uplink transmission based on the first timing adjustment parameter. According to another aspect, a method includes a timing adjustment parameter determiner module configured to determine at least a first timing adjustment parameter based on at least a first numerology parameter. The method also includes a timing adjustment module configured to adjust the timing of an uplink transmission based on the first timing adjustment parameter. These arrangements allow for the preservation of network node reception performance.

20 Claims, 11 Drawing Sheets

Related U.S. Application Data

(60) Provisional application No. 62/402,717, filed on Sep. 30, 2016, provisional application No. 62/402,545, filed on Sep. 30, 2016.

(56) References Cited

U.S. PATENT DOCUMENTS

| | | | |
|---|---|---|---|
| 9,231,666 | B2 | 1/2016 | Muharemovic et al. |
| 9,763,203 | B2* | 9/2017 | Dinan .................. H04B 7/2618 |
| 2012/0014371 | A1 | 1/2012 | Weng et al. |
| 2013/0201911 | A1 | 8/2013 | Bergstrom et al. |
| 2015/0003427 | A1 | 1/2015 | Wan et al. |
| 2015/0085839 | A1* | 3/2015 | Bergstrom ........ H04W 56/0045 370/336 |
| 2015/0189610 | A1* | 7/2015 | Siomina ................... H04L 5/14 370/280 |
| 2015/0215887 | A1* | 7/2015 | Nejatian ........... H04W 56/0045 370/350 |
| 2015/0236589 | A1* | 8/2015 | Baba ........................ H02M 7/44 307/82 |
| 2015/0244415 | A1 | 8/2015 | Shudark et al. |
| 2015/0264683 | A1 | 9/2015 | Kim et al. |
| 2015/0327198 | A1* | 11/2015 | Axmon ............. H04W 56/0045 370/336 |
| 2015/0327249 | A1* | 11/2015 | Kitazoe ................. H04W 52/50 370/329 |
| 2016/0192376 | A1 | 6/2016 | Lee et al. |
| 2016/0379486 | A1* | 12/2016 | Taylor ...................... G08G 1/08 340/905 |
| 2017/0086158 | A1 | 3/2017 | Feng et al. |
| 2017/0290001 | A1* | 10/2017 | Axmon ................. H04W 72/21 |
| 2017/0367058 | A1* | 12/2017 | Pelletier .............. H04W 52/246 |
| 2019/0150149 | A1 | 5/2019 | Tang |

FOREIGN PATENT DOCUMENTS

| | | |
|---|---|---|
| CN | 102647783 A | 8/2012 |
| CN | 103298136 A | 9/2013 |
| CN | 103765964 A | 4/2014 |
| CN | 104094548 A | 10/2014 |
| CN | 104272821 A | 1/2015 |
| CN | 104782213 A | 7/2015 |
| CN | 104956758 A | 9/2015 |
| EP | 1235367 A2 | 2/2002 |
| EP | 2215749 A1 | 8/2010 |
| JP | 2015-508971 A | 3/2015 |
| JP | 2015-516775 A | 6/2015 |
| RU | 2014135515 A | 6/2016 |
| WO | 2016/057195 A1 | 4/2016 |
| WO | 2016-105570 A1 | 6/2016 |

OTHER PUBLICATIONS

Written Opinion of the International Preliminary Examining Authority dated Sep. 7, 2018 and issued in corresponding PCT Application No. PCT/IB2017/056074, consisting of 7 pages.
Notification of Transmittal of the International Preliminary Report on Patentability dated Dec. 13, 2018 and issued In corresponding PCT Application No. PCT/IB2017/056074, consisting of 22 pages.
Russian Office Action and Search Report dated Aug. 22, 2019 together with English translation thereof issued in corresponding Russian Application No. 2019112676/07(024620), consisting of 14 pages.
European Examination Report dated May 4, 2020 issued in corresponding European Patent Application No. 17 794 069.9, consisting of 5 pages.
Russian Decision to Grant dated Jan. 15, 2020 together with English translation thereof issued in corresponding Russian Application No. 2019112676/07(024620), consisting of 17 pages.
Korean Preliminary Rejection dated Mar. 24, 2020 together with English translation thereof issued in corresponding Korean Application No. 10-2019-7012185, consisting of 9 pages.
European Communication Pursuant to Article 94(3) EPC dated Dec. 9, 2020 issued in corresponding European Patent Application No. 17794069.9, consisting of 4 pages.
Indian Examination Report dated Dec. 31, 2020 issued in Indian Patent Application No. 201917009493, consisting of 6 pages.
Korean Notice of Final Rejection and English translation thereof dated Dec. 29, 2020 issued in Korean Patent Application No. 10-2019-7012185, consisting of 7 pages.
Chinese Office Action and Search Report and English language Summary of the Office Action and Search Report dated Nov. 24, 2020 issued in corresponding Chinese Application No. 201780059949.0, consisting of 19 pages.
Chinese Office Action and English language Summary of the Office Action dated Jun. 29, 2021 issued in corresponding Chinese Application No. 201780059949.0, consisting of 7 pages.
Yuan Naihua; TD Tech, TD-SCDMA; China Academic Journal Electronic Publishing House; Node B; (c) 1994-2021 consisting of 5 pages.
3GPP TSG RAN WG1 Meeting #85; R1-163960; Nanjing, China May 23-27, 2016; Source: Chairman; Title: Draft Agenda; Document for: Decision, consisting of 8 pages.
European Extended Search Report dated Jul. 7, 2022 issued in corresponding European Patent Application No. 22169374.0 consisting of 8 pages.
3GPP TSG-RAN WG2 #95; Tdoc R2-165340; Title: Targeted protocol Latency; Source: Ericsson; Agenda Item: 9.2; Document for: Discussion, Decision, Gothenburg, Sweden, Aug. 22-26, 2016, consisting of 5 pages.
Japanese Office Action and English language summary thereof dated May 15, 2020 issued in corresponding Japanese Patent Application No. 2019-514103, consisting of 8 pages.
Chinese Office Action and English Summary translation of the Chinese Office Action dated Aug. 9, 2023 issued in corresponding Chinese Patent Application No. 2022102024058, consisting of 9 pages.

* cited by examiner

AUTONOMOUS TIMING ADJUSTMENT FOR A WIRELESS DEVICE

CROSS-REFERENCE TO RELATED APPLICATIONS

This application is a continuation of U.S. application Ser. No. 16/336,973, filed Mar. 27, 2019, entitled "AUTONOMOUS TIMING ADJUSTMENT FOR A WIRELESS DEVICE", now U.S. Pat. No. 11,497,015, which claims priority to International Application No. PCT/IB2017/056074, filed Oct. 2, 2017, entitled "AUTONOMOUS TIMING ADJUSTMENT FOR A WIRELESS DEVICE", which claimed priority to U.S. Provisional Application No. 62/402,717, filed Sep. 30, 2016, and U.S. Provisional Application No. 62/402,545, filed on Sep. 30, 2016, the entireties of all of which are incorporated herein by reference.

TECHNICAL FIELD

The present disclosure relates to wireless communications, and in particular, to a method and system for a communication network, and in particular to autonomous timing adjustment under various numerologies.

BACKGROUND

Wireless communication networks typically rely on time alignment to ensure the ability of the receiver to be able to properly receive and decode a wireless communication signal. FIG. 1 is a block diagram of a communication system 10 having wireless devices 12 and base stations 14 useful to aid understanding of this concept. In order to preserve orthogonality in the uplink (UL) in system 10, the UL transmissions from multiple wireless devices 12a-12n (hereinafter wireless 12) need to be time aligned at the evolved node B 14 (eNodeB 14). Since wireless devices 12 may be located at different distances from the eNodeB 14 as illustrated in FIG. 1, wireless devices 12 will need to initiate their UL transmissions at different times.

Time Alignment

A wireless device 12 far from the eNodeB needs to start transmission earlier than a wireless device 12 close to the eNodeB 14. This can, for example, be handled by timing advance of the UL transmissions, such that wireless device 12 starts its UL transmission before a nominal time given by the timing of the DL signal received by wireless device 12. This concept is illustrated in FIG. 2, which illustrates timing advance of UL transmissions depending on distance to eNodeB 14 (arrows pointing downwards indicate downlink transmissions and arrows pointing upwards indicate uplink transmissions). Wireless device 12 transmission timing may be adjusted based on timing advance (TA) commands (in a medium access control (MAC) message) received from the network or autonomously by wireless device 12. The timing adjustment has to meet certain accuracy requirements and is typically done in steps of a predefined size.

Wireless Device 12 Autonomous Timing Adjustment Based on DL Reception Timing

The UL timing advance is maintained by eNodeB 14 through timing alignment or timing advance (TA) commands to the wireless device 12 based on measurements on UL transmissions from that wireless device 12. This is also called a network controlled or eNB 14 controlled wireless device 12 transmit timing. Through timing alignment commands, the wireless device is ordered to start its UL transmissions earlier or later.

Different serving cells used by the same wireless device may have different timing advance. Serving cells sharing the same TA value (for example, depending on the deployment) for the same wireless device may be configured by the eNB to belong to a so called TA group (TAG). If at least one serving cell of the TA group is time aligned, all serving cells belonging to the same group may use this TA value.

According to the current requirements of the Third Generation Partnership Project (3GPP), the wireless device shall adjust the timing of its transmissions with a relative accuracy better than or equal to within ±4*TS to the signaled timing advance value compared to the timing of preceding uplink transmission, where TS is a time unit. The timing advance command is expressed in multiples of 16*TS and is relative to the current uplink timing.

In addition to the timing advance (TA) based adjustment of the UL transmit timing, there is also a pre-defined requirement on wireless device 12 to autonomously adjust its UL timing in response to the drift in eNode B 14 transmit timing, i.e., the DL reference cell, which is the serving cell. More specifically, wireless device 12 is required to follow the change in the frame transmit timing of the DL reference cell, e.g., serving cell, and correspondingly adjust its transmit timing for each transmission. Wireless device 12 typically uses some sort of reference signals to track the downlink timing of the serving cell, e.g., common reference signal, synchronization signals, etc.

The autonomous timing adjustment is applied by wireless device 12 for transmitting uplink signals when wireless device 12 does not have a valid timing advance adjustment command. Wireless device 12 also applies autonomous timing adjustment for initial transmission of signals, e.g., random access transmission. Wireless device 12 also applies autonomous timing adjustment for first transmission of signals in DRX or after long inactivity, e.g., time alignment timer (TAT) expires rendering the TA command invalid. All autonomous timing adjustments made to the wireless device uplink timing follow some rules. For example:

The maximum amount of the magnitude of the timing change in one adjustment is Tq seconds.

The minimum aggregate adjustment rate is 7*Ts per second.

The maximum aggregate adjustment rate is Tq per 200 ms, where Ts=32.55 nanoseconds (ns) and Tq depends on the bandwidth of the DL reference cell. An example of Tq is 3.5 Ts for a DL BW of 10 MHz or larger.

The serving cell timing may change for different reasons, e.g., due to variation in radio conditions, imperfection in clocks, maintenance activities, deliberate attempt by the network to change timing, etc. In addition, it is also required that wireless device 12 changes its timing (increase or decrease) with a certain rate. This is to make sure that wireless device 12 does not change the timing too fast. This requirement stems from the fact that if wireless device 12 changes its timing in the order of several microseconds (μs) from subframe to subframe, the base station receiver may not be able to cope with the received signals. This will result in degradation of demodulation of signals transmitted by wireless device 12.

Numerologies

For Long Term Evolution (LTE), the term "numerology" may include, e.g., the following elements, i.e., parameters: frame duration, subframe or transmission time interval (TTI) duration, slot duration, symbol duration and number of symbols per slot and subframe, subcarrier spacing, sampling frequency, fast Fourier transform (FFT) size, number of subcarriers per resource Block (RB), number of RBs within the bandwidth, and cyclic prefix length. Note that different numerologies may result in different numbers of RBs within the same bandwidth.

The exact values for the numerology elements in different radio access technologies are typically driven by performance targets. As an example, performance requirements impose constraints on usable subcarrier spacing sizes. As another example, the maximum acceptable phase noise and the slow decay of the spectrum (impacting filtering complexity and guardband sizes) set the minimum subcarrier bandwidth for a given carrier frequency, and the required cyclic prefix sets the maximum subcarrier bandwidth for a given carrier frequency.

However, the numerology used so far in the existing radio access technologies (RATs) is rather static and typically can be trivially derived by wireless device 12, e.g., by one-to-one mapping to the RAT, frequency band, service type (e.g., multimedia broadcast multicast service (MBMS)), etc.

In LTE downlink which is orthogonal frequency division multiplex (OFDM)-based, the subcarrier spacing is 15 kHz for normal cyclic prefix (CP) and 15 kHz and 7.5 kHz (i.e., the reduced carrier spacing) for extended CP, where the latter is allowed only for MBMS-dedicated carriers. The support of multiple numerologies has been agreed for new radio (NR), which can be multiplexed in the frequency and/or time domain for the same or different wireless devices.

In New Radio (NR), which is to be based on orthogonal frequency division multiplex (OFDM), multiple numerologies will be supported for general operation. A scaling approach (based on a scaling factor $2^n$, n=1, 2, . . . ) is considered for deriving subcarrier spacing candidates for NR: 15 kHz, 30 kHz, 60 kHz, etc. Subcarrier spacing(s) of up to 960 kHz are currently being discussed for NR (the highest discussed values corresponding to millimeter-wave based technologies). Further, multiplexing different numerologies within a same NR carrier bandwidth should be supported, and frequency division multiplexing (FDM) and/or time division multiplexing (TDM) can be considered. Further, multiple frequency/time portions using different numerologies should share a synchronization signal, where the synchronization signal refers to the signal itself and the time-frequency resource used to transmit the synchronization signal. Also, the numerology used can be selected independently of the frequency band although it is assumed that a very low subcarrier spacing will not be used at very high carrier frequencies. FIG. 3 illustrates example subcarrier spacing candidate configurations for NR with various cell sizes 16 and various frequencies 18.

NR Architecture

NR (also known as 5G or Next Generation) architecture is being discussed in 3GPP and the current concept is illustrated in FIG. 4. In FIG. 4, eNB denotes LTE eNodeB 14, gNB denotes NR base station (BS) 20 (one NR BS 20 may correspond to one or more transmission/reception points), and the lines between the nodes illustrate the corresponding interfaces which are under discussion in Third Generation Partnership Project (3GPP). Further, FIGS. 5 and 6 illustrate deployment scenarios with NR BS 20 which are discussed in 3GPP.

SUMMARY

In existing solutions, one set of wireless devices transmit timing adjustment parameters is used. For example, the TA step size of 16 Ts is used in LTE. However, these existing values are not optimal for NR where different numerologies can be used on different carriers or at different times on the same carrier. For example, one set of values may lead to a large timing inaccuracy for certain numerology. This will drastically degrade the network node, e.g., base station, reception performance. This in turn will deteriorate the system performance or the system may not even operate.

Certain aspects of the present disclosure and their embodiments may provide solutions to these or other problems. In the general sense, the embodiments provided herein provide methods, wireless devices and network nodes that determine timing adjustment parameters based on numerology parameter(s) and then adjust the timing of a transmission based on the timing adjustment parameter. These arrangements allow for the preservation of network node reception performance.

In some embodiments, a method in a wireless device of adjusting timing of transmissions is provided. The method includes determining at least a first timing adjustment parameter based on at least a first numerology parameter. The method also includes adjusting the timing of an uplink transmission based on the first timing adjustment parameter.

In some embodiments, the method further includes transmitting the uplink signals according to the adjusted uplink transmit timing. In some embodiments, the uplink transmit timing adjustment is based on at least one of a characteristic of an uplink signal, a characteristic of a downlink signal and numerology parameters. In some embodiments, the first numerology parameter is a maximum adjustment amount of one adjustment step based on a subcarrier spacing. In some embodiments, the first numerology parameter is a frequency of a timing adjustment based on a carrier frequency of the uplink transmission. In some embodiments, the first numerology parameter is an aggregate adjustment rate at which the wireless device updates an uplink transmission timing, the aggregate adjustment rate being based on a subcarrier spacing. In some embodiments, the method further includes determining a second timing adjustment parameter based on a second numerology parameter; determining a numerology to be used by the wireless device for uplink transmissions; selecting one of the first timing adjustment parameter and the second timing adjustment parameter based on the determined numerology; and applying the selected one of the first and second timing adjustment parameters to adjust the timing of an uplink transmission. In some embodiments, the first timing adjustment parameter is based on a determined uplink numerology and a second timing adjustment parameter is based on a determined downlink numerology. In some embodiments, the at least a first timing adjustment parameter is determined autonomously by the wireless device. In some embodiments, the first timing adjustment parameter is determined based on one of a rule and a predefined value received from a network node. In some embodiments, the first timing adjustment parameter is further determined based on one of an uplink bandwidth and a downlink bandwidth. In some embodiments, the at least a first timing adjustment parameter is a timing advance command received from a network node. In some embodiments, the first and/or second numerology parameter comprises one or more of: frame duration, subframe duration, transmission time interval (TTI) duration, slot duration, symbol duration and number of symbols per slot and subframe, subcarrier spacing, sampling frequency, fast Fourier transform (FFT) size, number of subcarriers per resource Block (RB), number of RBs within the bandwidth, and cyclic prefix length.

In some embodiments, a wireless device configured for adjusting timing of transmissions is provided. The wireless device includes processing circuitry configured to: determine at least a first timing adjustment parameter based on at least a first numerology parameter; and adjust the timing of an uplink transmission based on the first timing adjustment parameter.

In some embodiments, the processing circuitry is further configured to transmit the uplink signals according to the adjusted uplink transmit timing. In some embodiments, the uplink transmit timing adjustment is based on at least one of a characteristic of an uplink signal, a characteristic of a downlink signal and numerology parameters. In some embodiments, the first numerology parameter is a maximum adjustment amount of one adjustment step based on a subcarrier spacing. In some embodiments, the first numerology parameter is a frequency of a timing adjustment based on a carrier frequency of the uplink transmission. In some embodiments, the first numerology parameter is an aggregate adjustment rate at which the wireless device updates an uplink transmission timing, the aggregate adjustment rate being based on a subcarrier spacing. In some embodiments, the processing circuitry is further configured to: determine a second timing adjustment parameter based on a second numerology parameter; determine a numerology to be used by the wireless device for uplink transmissions; select one of the first timing adjustment parameter and the second timing adjustment parameter based on the determined numerology; and apply the selected one of the first and second timing adjustment parameters to adjust the timing of an uplink transmission. In some embodiments, the first timing adjustment parameter is based on a determined uplink numerology and a second timing adjustment parameter is based on a determined downlink numerology. In some embodiments, the at least a first timing adjustment parameter is determined autonomously by the wireless device. In some embodiments, the first timing adjustment parameter is determined based on one of a rule and a predefined value received from a network node. In some embodiments, the first timing adjustment parameter is further determined based on one of an uplink bandwidth and a downlink bandwidth. In some embodiments, the first timing adjustment parameter is a timing advance command received from a network node. In some embodiments, the first and/or second numerology parameter comprises one or more of: frame duration, subframe duration, transmission time interval (TTI) duration, slot duration, symbol duration and number of symbols per slot and subframe, subcarrier spacing, sampling frequency, fast Fourier transform (FFT) size, number of subcarriers per resource Block (RB), number of RBs within the bandwidth, and cyclic prefix length.

In some embodiments, a wireless device configured for adjusting timing of transmissions is provided. The wireless device includes a timing adjustment parameter determiner module configured to determine at least a first timing adjustment parameter based on at least a first numerology parameter. The wireless device further includes a timing adjustment module configured to adjust the timing of an uplink transmission based on the first timing adjustment parameter.

In some embodiments, a method in a network node for adjusting timing of received signals. The method includes determining at least a first timing adjustment parameter based on at least a first numerology parameter, the first timing adjustment parameter related to an amount of transmit timing adjustment to be applied by a wireless device for transmitting an uplink signal. The method also includes adapting at least one parameter of a receiver of the network node based on the determined at least one first timing adjustment parameter.

In some embodiments, the method further includes receiving uplink transmissions from the wireless device using the adapted at least one parameter of the receiver. In some embodiments, the method further includes transmitting to the wireless device a rule for determining the first timing adjustment parameter based on at least the first numerology. In some embodiments, the method further includes transmitting to the wireless device a pre-defined value for determining the first timing adjustment parameter based on at least the first numerology. In some embodiments, the method further includes transmitting to the wireless device a first timing adjustment parameter based on at least the first numerology. In some embodiments the first timing adjustment parameter is a timing advance command. In some embodiments, the first numerology parameter comprises one or more of: frame duration, subframe duration, transmission time interval (TTI) duration, slot duration, symbol duration and number of symbols per slot and subframe, subcarrier spacing, sampling frequency, fast Fourier transform (FFT) size, number of subcarriers per resource Block (RB), number of RBs within the bandwidth, and cyclic prefix length.

In some embodiments, a network node for adjusting timing of received signals. The network node includes processing circuitry configured to determine at least a first timing adjustment parameter based on at least a first numerology parameter, the first timing adjustment parameter related to an amount of transmit timing adjustment to be applied by a wireless device for transmitting an uplink signal. The processing circuitry is further configured to adapt at least one parameter of a receiver of the network node based on the determined at least one first timing adjustment parameter.

In some embodiments, the processing circuitry is further configured to receive uplink transmissions from the wireless device using the adapted at least one parameter of the receiver. In some embodiments, the processing circuitry is further configured to transmit to the wireless device a rule for determining the first timing adjustment parameter based on at least the first numerology. In some embodiments, the processing circuitry is further configured to transmit to the wireless device a pre-defined value for determining the first timing adjustment parameter based on at least the first numerology.

In some embodiments, the processing circuitry is further configured to transmit to the wireless device the first timing adjustment parameter based on at least the first numerology. In some embodiments the first timing adjustment parameter is a timing advance command. In some embodiments, the first numerology parameter comprises one or more of: frame duration, subframe duration, transmission time interval (TTI) duration, slot duration, symbol duration and number of symbols per slot and subframe, subcarrier spacing, sampling frequency, fast Fourier transform (FFT) size, number of subcarriers per resource Block (RB), number of RBs within the bandwidth, and cyclic prefix length.

In some embodiments, a network node for adjusting timing of received signals is provided. The network node includes a timing adjustment parameter determiner module configured to determine at least a first timing adjustment parameter based on at least a first numerology parameter, the first timing adjustment parameter related to an amount of transmit timing adjustment to be applied by a wireless device for transmitting an uplink signal. The network node further includes a receiver parameter adapted configured to adapt at least one parameter of a receiver of the network node based on the determined at least one first timing adjustment parameter.

Certain embodiments may have all, some, or none of the above advantages. Other advantages will be apparent to persons of ordinary skill in the art.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
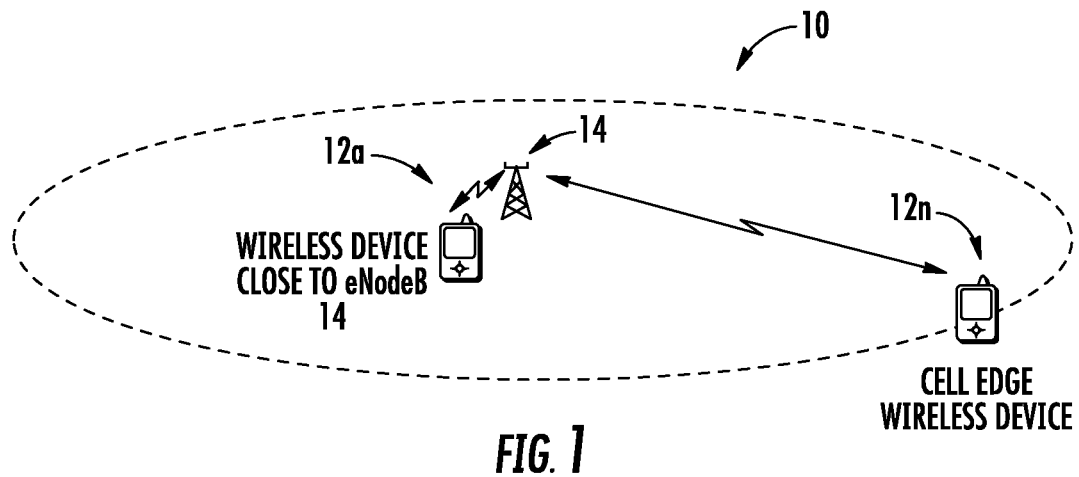
FIG. 1 is a block diagram of a network cell with wireless devices at different distances form the node.
Figure 2:
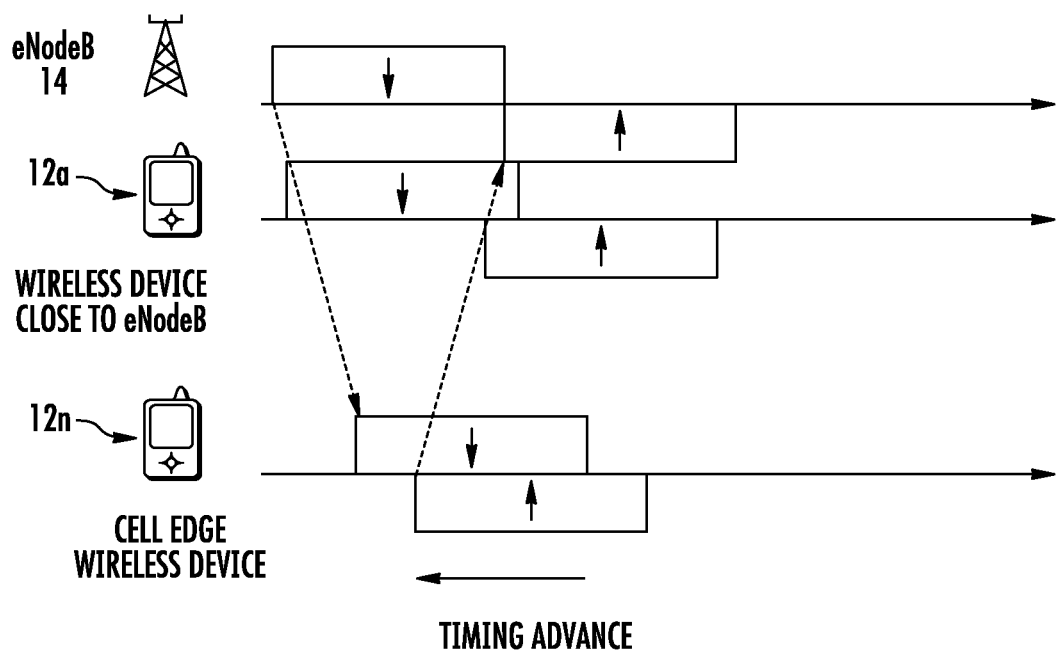
FIG. 2 is a block diagram of timing advance of uplink transmissions depending on distance to the node.
Figure 3:
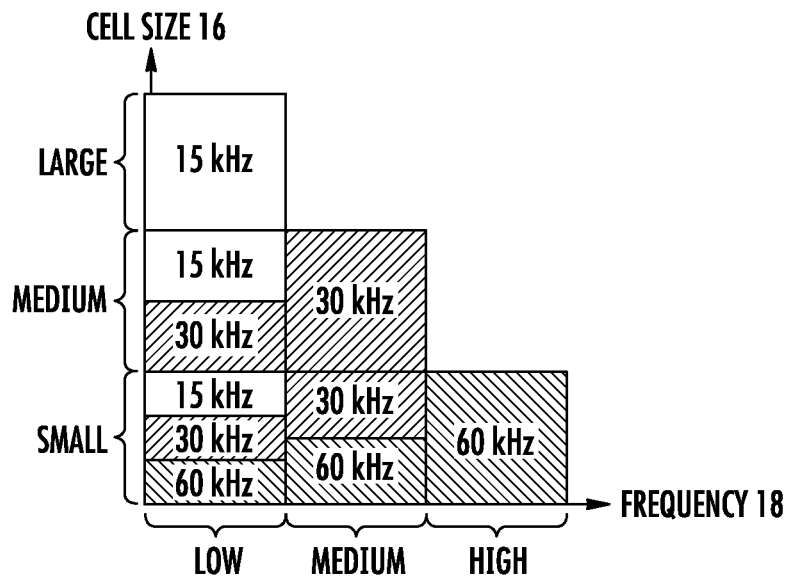
FIG. 3 is a block diagram of various subcarrier spacing candidate configurations.
Figure 4:
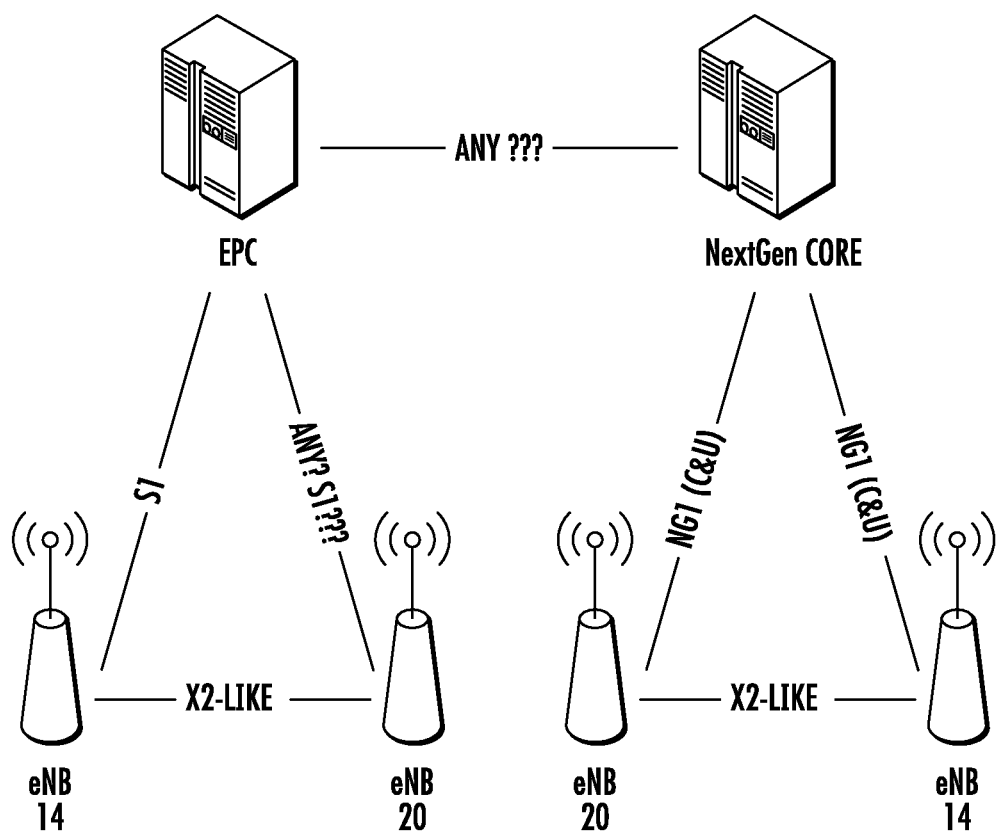
FIG. 4 is a block diagram of new radio architecture.
Figure 5:
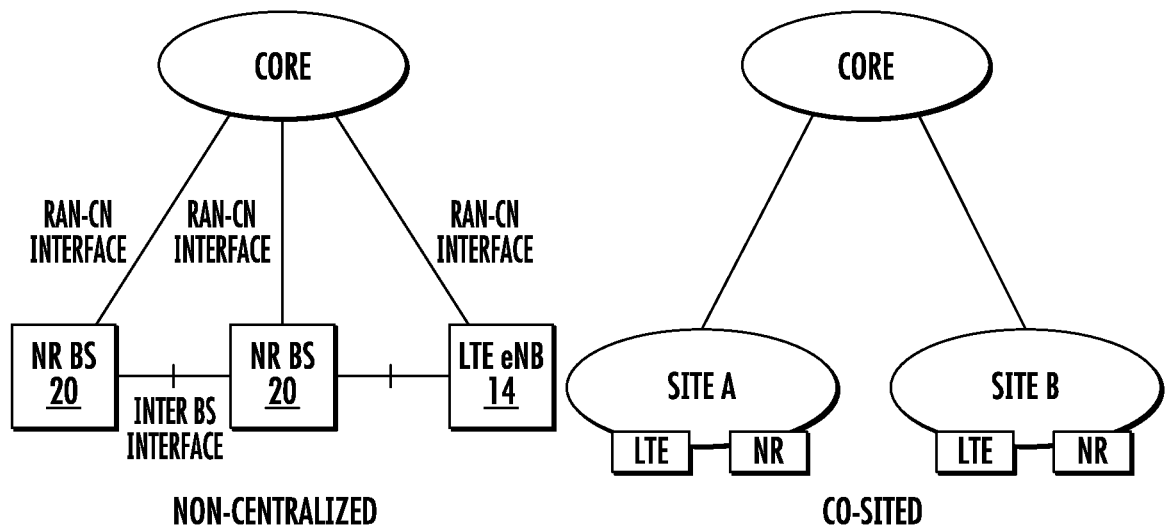
FIGS. 5-6 is a block diagram of NR deployment examples.
Figure 6:
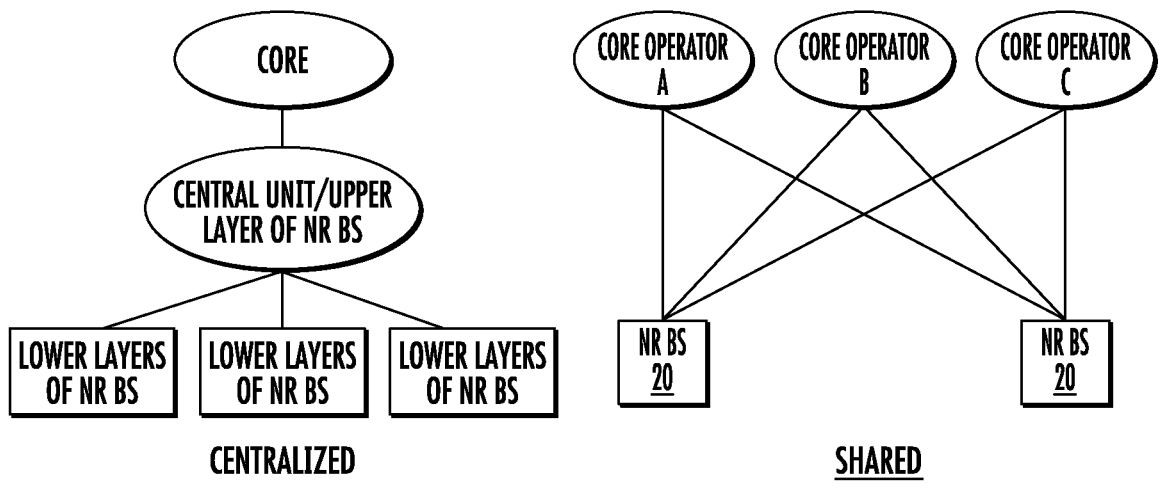

The present disclosure advantageously provides for autonomous timing adjustment under various numerologies.

Accordingly, method, wireless device, node and system components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Any two or more embodiments described in this disclosure may be combined in any way with each other. The described embodiments are not limited to NR, but can be adapted in other RATs too, e.g., LTE, Universal Terrestrial Radio Access (UTRA), LTE-Advanced, 5G, NB-Internet of Things (IoT), Wi-Fi, BlueTooth, or any new radio systems which may use flexible numerology. The embodiments described here may apply, e.g., to a general single-carrier or multi-carrier/carrier aggregation (CA)/dual-connectivity/multi-connectivity etc. deployment.

The wireless device herein can be any type of wireless device, such as a user equipment (UE) capable of communicating with network node or another wireless device over radio signals. The wireless device may also be radio communication device, target device, device to device (D2D) wireless device, machine type wireless device or wireless device capable of machine to machine communication (M2M), a sensor equipped with wireless device, iPAD, Tablet, mobile terminals, smart phone, laptop embedded equipped (LEE), laptop mounted equipment (LME), universal serial bus (USB) dongles, Customer Premises Equipment (CPE) etc.

The term "network node" used herein may refer to a radio network node or another network node, e.g., a core network node, MSC, MME, O&M, OSS, SON, positioning node (e.g. E-SMLC), MDT node, etc.

The term "network node" or "radio network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., $3^{rd}$ party node, a node external to the current network), nodes in distributed antenna system (DAS) etc. The network node may also comprise test equipment. The term "radio node" used herein may be used to also denote a wireless device such as a UE or a radio network node.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

The embodiments are applicable to single carrier as well as to multicarrier or carrier aggregation (CA) operation of the wireless device in which the wireless device is able to receive and/or transmit data to more than one serving cells. The term carrier aggregation (CA) is also called (e.g. interchangeably called) "multi-carrier system", "multi-cell operation", "multi-carrier operation", "multi-carrier" transmission and/or reception. In CA one of the component carriers (CCs) is the primary component carrier (PCC) or simply primary carrier or even anchor carrier. The remaining ones are called secondary component carrier (SCC) or simply secondary carriers or even supplementary carriers. The serving cell is interchangeably called as primary cell (PCell) or primary serving cell (PSC). Similarly, the secondary serving cell is interchangeably called as secondary cell (SCell) or secondary serving cell (SSC).

In Dual Connectivity (DC) operation the wireless device can be served by at least two nodes called master eNB (MeNB) and secondary eNB (SeNB). More generally in multiple connectivity (aka multi-connectivity) operation the wireless device can be served by two or more nodes, e.g., MeNB, SeNB1, SeNB2 and so on. The wireless device is configured with PCC from both MeNB and SeNB. The PCell from MeNB and SeNB are called as PCell and PSCell respectively. The PCell and PSCell operate the wireless device typically independently. The wireless device is also configured with one or more SCCs from each of MeNB and SeNB. The corresponding secondary serving cells served by MeNB and SeNB are called SCell. The wireless device in DC typically has separate TX/RX for each of the connections with MeNB and SeNB. This allows the MeNB and SeNB to independently configure the wireless device with one or more procedures e.g. radio link monitoring (RLM), DRX cycle, etc., on their PCell and PSCell respectively. The methods and embodiments are applicable to both CA, DC and Multi-Connectivity (MC).

The term "signaling" used herein may include any of: high-layer signaling (e.g., via radio resource control, RRC, or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "time resource" used herein may correspond to any type of physical resource or radio resource expressed in terms of length of time. Examples of time resources are: symbol, time slot, subframe, radio frame, TTI, interleaving time, etc.

The term "flexible numerology" used herein may refer, e.g., to any one or more of: subcarrier spacing, number of subcarriers per RB, number of RBs within the bandwidth, etc. which can be configured in a flexible way such as changing dynamically or semi-statically. For example, one cell may use two numerologies on different resources. In another example, the network includes cells using different numerologies, e.g., one the same or different carrier frequencies, and the cell numerologies cannot be trivially known e.g. to a wireless device performing a measurement.

The term "radio measurement" used herein may refer to any measurement performed on radio signals. Radio measurements can be absolute or relative. Radio measurements can be e.g. intra-frequency, inter-frequency, CA, etc. Radio measurements can be unidirectional (e.g., DL or UL) or bidirectional (e.g., round trip time, RTT, Rx-Tx, etc.). Some examples of radio measurements: timing measurements (e.g., time of arrival (TOA), timing advance, round trip time (RTT), RSTD, SSTD, Rx-Tx, propagation delay, etc.), angle measurements (e.g., angle of arrival), power-based measurements (e.g., received signal power, RSRP, received signal quality, RSRQ, signal to interference plus noise, SINR, signal to noise ratio, SNR, channel state information, CSI, channel quality index, CQI, PMI, interference power, total interference plus noise, received signal strength indicator, RSSI, noise power, etc.), cell detection or identification, beam detection or identification, system information reading (e.g. acquisition of management information base, MIB, and/or one or more SIBs, etc.), acquisition of cell global ID (CGI), RLM.

In some embodiments, the amount of transmit timing adjustment applied by the wireless device depends on at least the numerology of the uplink signals transmitted by the wireless device e.g. the adjustment is equal to a factor of a time unit, Ts, wherein the factor depends on the numerology. In some embodiments, different amount of timing adjustment is achieved by at least applying a different time unit which depends on numerology.

Methods for Determining the Amount of Timing Adjustment

The term "amount of timing adjustment" used herein refers to the amount of timing adjustment in one or multiple steps (e.g., over a certain time). In the latter, the adjustment in each step may depend on the number of steps over the corresponding time.

In some embodiments, the timing adjustment is applied by the wireless device for the transmit time of the uplink signals transmitted by the wireless device. The timing adjustment may be applied by the wireless device based on adjustments based on request received from another node e.g. applying TA command which is received from the network node.

Variable Timing Adjustment in Multiples of the Same Time Units

One way in which the timing adjustment can be set is by adjusting the number of time units with which the adjustment is done. For example, if a larger timing adjustment is to be done, the timing adjustment is a larger multiple N1 of a time unit, while if a smaller timing adjustment is to be done, the timing adjustment is a smaller multiple N2 of a time unit. The amount of time adjustment may then be N1*deltaT, wherein deltaT is a time unit. Examples of deltaT is 32.55*10-9 seconds or Ts (i.e. 32.55 ns). Another more generalized example of deltaT is deltaT=frame length in time/H; where H is a constant value. In another general example deltaT can be function of one or more of the following: frame length, subframe length, slot length etc.

More generally, the amount of time adjustment (Tai) may be a function of at least one parameter associated with at least one numerology of the carrier frequency (Ni), deltaT and margin ($\alpha i$):

$$Tai = f(Ni, deltaT, \alpha i) \quad (1)$$

The parameter, Tai, is also called an adjustment step, adjustment size, smallest adjustment value, etc. In one example, N1 is associated with a first numerology, and N2 is associated with a second numerology. The first numerology may be 15 kHz, and the second numerology may be 60 kHz or above. The example may be extended for Ni, i>2. As a special case, $\alpha$ can be neglected.

In a specific example Ta1 and Ta2 for numerology #1 and numerology #2 respectively can be expressed by (2) and (3) below:

$$Ta1 = N1 * deltaT * \alpha 1 \quad (2)$$

$$Ta2 = N2 * deltaT * \alpha 2 \quad (3)$$

Further assume that N1 and N2 are related to subcarrier spacings of 15 KHz and 60 KHz respectively. In this case, as an example, N1 and N2 are 16 and 4 respectively while $\alpha 1 = \alpha 2 = 1$.

The same time unit may be used with N1 and N2. The time unit may be the same fixed pre-defined value for all numerologies, may be configurable, may be determined based on a pre-defined rule, or may be determined based on a reference numerology (e.g., when multiple numerologies are used by the same wireless device in DL and UL and/or on the same or different carrier frequencies one of the multiple numerologies may be selected as a reference).

The timing adjustment step size may also be called a minimum or smallest timing adjustment step, e.g., minimum TA adjustment value. The timing adjustment parameter can have positive or negative values, e.g., $\pm Y$ Ts.

An example of the magnitude of the timing advance (TA) step size as a function of subcarrier spacing is shown in Table 1.

TABLE 1

| No. | Subcarrier spacing (KHz) | TA adjustment step size (Ts) |
|---|---|---|
| 1 | 15 | 16 |
| 2 | 30 | 8 |
| 3 | 45 | 16/3 |
| 4 | 60 | 4 |

In yet another example, timing advance (TA) step size as a function of a group of numerologies (e.g., subcarrier spacings) can also be defined. For example, subcarrier spacings within a certain margin (e.g., within 30 KHz) can be associated with the same TA adjustment step size. The TA adjustment step size for the group of subcarriers can be defined based on a rule or a function. One example of such a rule is defining one fixed pre-defined value. Examples of functions are minimum, maximum, average, etc. For example, the step size in a group may correspond to the minimum of the magnitude of the step sizes associated with each subcarrier in that group. This is shown in Table 2.

TABLE 2

| Group No. | Subcarrier No. | Subcarrier spacing (KHz) | TA adjustment step size (Ts) |
|---|---|---|---|
| 1 | 1 | 15 | 8 |
|   | 2 | 30 |   |
| 2 | 3 | 45 | 4 |
|   | 4 | 60 |   |

The value of Tai may further depend on one or more of the following parameters or conditions:
Bandwidth of a DL signal of the reference cell, e.g., smaller adjustment step (S1) for larger BW condition and larger step (S2) for smaller BW, where S2>S1;
Radio conditions, e.g., smaller adjustment step (S1) in static conditions and larger step (S2) in case of multipath fading, where S2>S1.

Selection of Multiple Ni

The multiple (Ni) may be obtained based on, e.g., one or more of:
A pre-defined rule or a function,
Mapping based on table(s). The tables can be pre-defined or configured by the network node,
A message or indication received from another node (e.g., a wireless device receiving from a serving BS, a network node receiving from another network node, a network node receiving from a wireless device, etc.), and
Derived based on a reference value (e.g., N1 is derived based on a reference number Nref or another Ni such as N2, for example: N1=2*Nref).

In one embodiment, the multiple Ni are selected based on a mapping defined in a specification where for each numerology there is defined a value Ni which may be applied. Alternatively, a formula can be defined determining how the value Ni is calculated as a function of the numerology or TTI or subframe length, e.g., Ni=16*TTI-duration (TTI=1 [ms] for 15 kHz carrier spacing, TTI=0.5 ms for subcarrier spacing of 30 KHz, TTI=0.25 ms for 60 KHz etc.).

In one example, using pre-defined values, mappings, functions, rules, etc., for determining Ni may allow for efficient signaling, since no explicit signaling of Ni may be needed if both the wireless device and network can apply the same value/mapping/function/rules, etc.

In another example, the determined Ni or a parameter or pre-defined value/mapping/function/rule to be used to determine Ni may be signaled to another node.

In another example, the multiple Ni which the wireless device may apply is determined based on signaling from the network. This allows the network to determine which multiple Ni to apply. This may be useful since some of the network nodes (e.g., gNBs) may be able to cope with a large error in the TA value and hence the multiple Ni could be large. This could then be beneficial since the network node (e.g., gNB) can change the TA value with big steps using a single TA command. This is so because for each TA command, the network node (e.g., gNB) can change the TA value for the wireless device with a large step. However, for another network node (e.g., gNB) (or in another scenario) only a small error may be acceptable to the TA value and hence a small multiple Ni should be applied since this allows for a more granular control of the TA value.

When the selection of the multiple Ni is based on signaling from the network it may be that a network node (e.g., gNB) signals this to the wireless device using, e.g., radio resource control (RRC) signaling. Using RRC signaling provides robustness since RRC signaling is protected by RRC retransmissions and hence the risk of a loss is small. However, the overhead of RRC signaling may be large.

In yet another example, the network node (e.g., gNB) indicates which multiple Ni the wireless device may apply by means of medium access control (MAC) signaling, e.g., such as in a MAC control element. MAC signaling may be quicker than RRC signaling which allows for a more dynamic adjustment of Ni. This may be beneficial if the numerology changes quickly and/or frequently, for the timing adjustment needs to be performed more frequently for some numerologies.

Timing Adjustment Size Based on Time Unit Duration

Another way to change the amount of timing adjustment is to adjust the time unit size with which the timing adjustment is made. So, if a small adjustment should be made, the amount of adjustment may be done using a smaller time unit, while if a large adjustment is needed the amount of adjustment may be done using a larger time unit. The time unit size may depend on the numerology. For example, a smaller unit may be associated with a larger carrier spacing, and a larger unit size may be associated with a smaller carrier spacing.

For example, to adjust the timing by a larger amount, the wireless device may apply an adjustment of N*T1 wherein T1 is the time unit, while if the wireless device needs to adjust the timing by a smaller amount, the wireless device may apply an adjustment of N*T2 based on unit T2, where T2 is smaller than T1.

More generally, the amount of time adjustment may be a function:

$$f(\text{delta}Ti),$$

where the function f may further depend on other timing adjustment parameters. In one example, f may also depend on a multiple (scaling factor) N which may be common for all numerologies. It should be appreciated that also with this alternative the timing adjustments may be a multiple of a time unit. For example, the timing adjustment may be 16*Ts where Ts is a variable time unit depending on the size of the wanted timing adjustment size. So, this timing adjustment may be 16*Ts where Ts is adjusted to change the size of the timing adjustment, while in the alternative, the time unit Ts is the same regardless of the timing adjustment size.

Timing Adjustment Based on Numerology Dependent Parameter(s)

In this embodiment, more generally, the amount of timing adjustment may depend on at least one parameter dependent on numerology, e.g., described by a function f(P) where P is the numerology dependent parameter. Using the multiple or scaling factor N (described in embodiments above) is one specific example of parameter P, but in general f may or may not scale linearly with P.

In yet a further embodiment, the amount of timing adjustment may depend on a parameter P and the time unit size which may also depend on numerology, e.g., for numerology i or group i of numerologies:

$$f(P, \text{delta}Ti).$$

Variable Maximum TA Value Dependent on Numerology

The maximum distance between the wireless device and the gNB depends on the maximum TA value applied by the wireless device. If the maximum supported TA value is small the supported distance between the wireless device and the eNB is smaller as compared to the maximum supported TA value.

In one embodiment, the maximum TA value which the wireless device applies depends on the numerology. To be able to support a large distance between the wireless device and the gNB even though the timing adjustment of each TA step is small, a larger number of TA steps may be applied instead. For example, in long term evolution (LTE) the maximum number of TA steps is $2^{11}$. And each TA step compensates roughly for 75 meters of propagation distance from the wireless device to the eNB. In case the embodiments described above are applied, then each TA step may be smaller and hence the maximum supported distance from the wireless device to the gNB/eNB would be reduced. However, with this embodiment it is possible to support a long distance between the wireless device and gNB/eNB even though the numerology would make each TA step smaller.

This may be realized by changing the maximum number of TA steps which can be applied dependent on numerology. For example, with a small TA step size the maximum number of TA steps may be increased to compensate for a shorter propagation distance, while with a larger TA step size the maximum number of TA steps may be decreased.

An example relationship between numerology (and associated subcarrier spacing) and maximum number of TA steps is provided in Table 3 below.

TABLE 3

| No. | Subcarrier spacing (KHz) | Maximum number of TA steps |
|---|---|---|
| 1 | 15 | 2048 |
| 2 | 30 | 2048*2 |
| 3 | 45 | 2048*3 |
| 4 | 60 | 2048*4 |

Variable TA Timer Handling Dependent on Numerology

For each TA value applied by the wireless device, the wireless device has a TA Timer (TAT) which determines whether the TA value is valid or not. If the TA timer is running, the wireless device considers the TA value valid, while if the timer is not running the wireless device considers the TA value not valid. The wireless device will restart the TA timer each time the wireless device gets an updated TA value from the eNB. If the wireless device has not received an updated TA value for a certain time, the TAT will expire, which renders the TA value invalid. In such embodiments, the wireless device may be only allowed to perform transmissions if the TA value associated with the transmission is valid.

The TA value is used to compensate for the propagation delay between the eNB and the wireless device. The TA value should ensure that uplink transmissions of a wireless device are received in a "receiver window". Whether a TA value should be considered valid or not depends on whether the uplink transmissions arrive in that "receiver window", and therefore depends on whether the TA value matches the actual propagation distance from the wireless device and the eNB. The propagation delay between the wireless device and the eNB changes as the wireless device moves closer to/away from the eNB. The duration of the TAT (which dictates how long the TA value should be considered valid after it has been updated) therefore depends on the speed of the wireless device; the TAT value of a wireless device moving fast should in general be shorter than the TAT value of a wireless device moving slow.

In one embodiment, the duration of the TA timer will be adjusted depending on the numerology. It may be that for a numerology with large subcarrier spacing the wireless device applies a shorter TAT duration, while with a smaller subcarrier spacing the wireless device applies a longer TAT. The benefit of this is that with a numerology with large subcarrier spacing, it may be more desirable that the error of TA value is small, while with a numerology with small subcarrier spacing the requirements on accuracy of the TA value may be relaxed.

Hence, some embodiments allow the wireless device to consider a TA value valid for a longer period of time if the numerology has a small subcarrier spacing. In this case, the TA value does not need to be updated as often as it would need to be for a numerology with large subcarrier spacing.

This embodiment may be realized by the eNB configuring a first duration for the TAT associated with a TA value used for transmissions of a first numerology and a second duration for a TAT associated with a TA value used for transmissions of a second numerology, e.g., a shorter duration for a numerology with large subcarrier spacing and a longer duration for a numerology with small subcarrier spacing.

Another possible implementation of this embodiment is that the wireless device scales the TAT duration dependent on numerology. The gNB/eNB may then send one TAT duration to the wireless device and the wireless device determines the actual timing duration which the wireless device will use for the different numerologies. This saves signaling compared to the case when the eNB signals different TAT durations for different TA values.

An example relation between numerology (and associated subcarrier spacing) and TAT duration is provided in Table 4 below.

TABLE 4

| No. | Subcarrier spacing (KHz) | TAT duration |
|---|---|---|
| 1 | 15 | 500 ms |
| 2 | 30 | 500/2 ms |
| 3 | 45 | 500/3 ms |
| 4 | 60 | 500/4 ms |

In one embodiment, the same duration is applied for all TATs of the wireless device, i.e. TATs associated with each TA value. The duration may then be determined considering all numerologies used by the wireless device. The TAT durations may be set considering the most stringent numerology (i.e. the numerology which requires the shortest TAT duration.) For example, using the example mapping in Table 3, if the wireless device is using both subcarrier spacing 15 and 45, the TAT duration may be set to the minimum TAT duration for these numerologies, i.e., 500/3 in this case.

Figure 7:
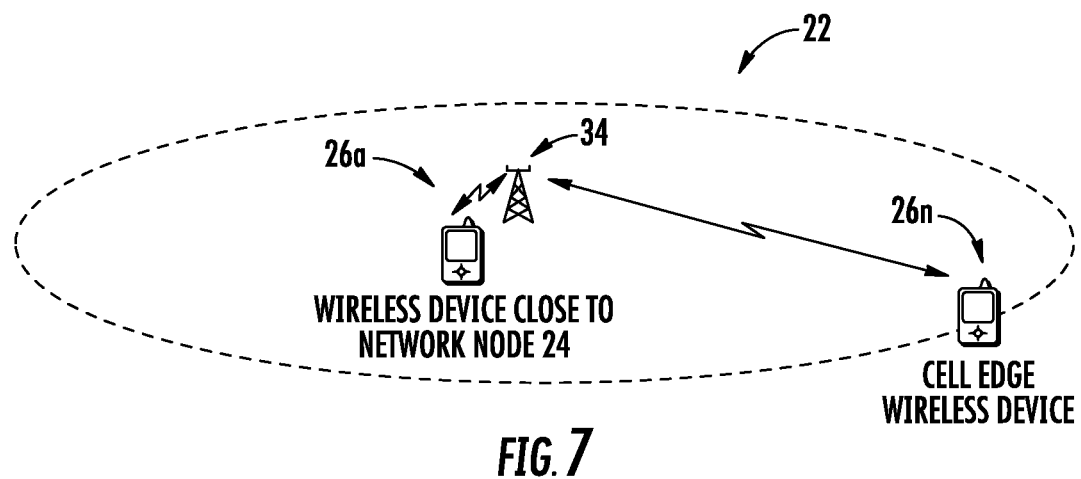
FIG. 7 is a block diagram of an exemplary system for autonomous timing adjustment under various numerologies in accordance with some embodiments.

Returning now to the drawing figures in which like reference designators refer to like elements there is shown in FIG. 7 an exemplary system for autonomous timing adjustment under various numerologies in accordance with the principles of the present disclosure and designated generally as "22." System 22 includes one or more network nodes 24 and one or more wireless devices 26a-26n (collectively referred to as wireless device 26), in communication with each other via one or more communication networks using one or more communication protocols, where wireless device 26 and/or network node 26 are configured to perform the processes described herein.

Figure 8:
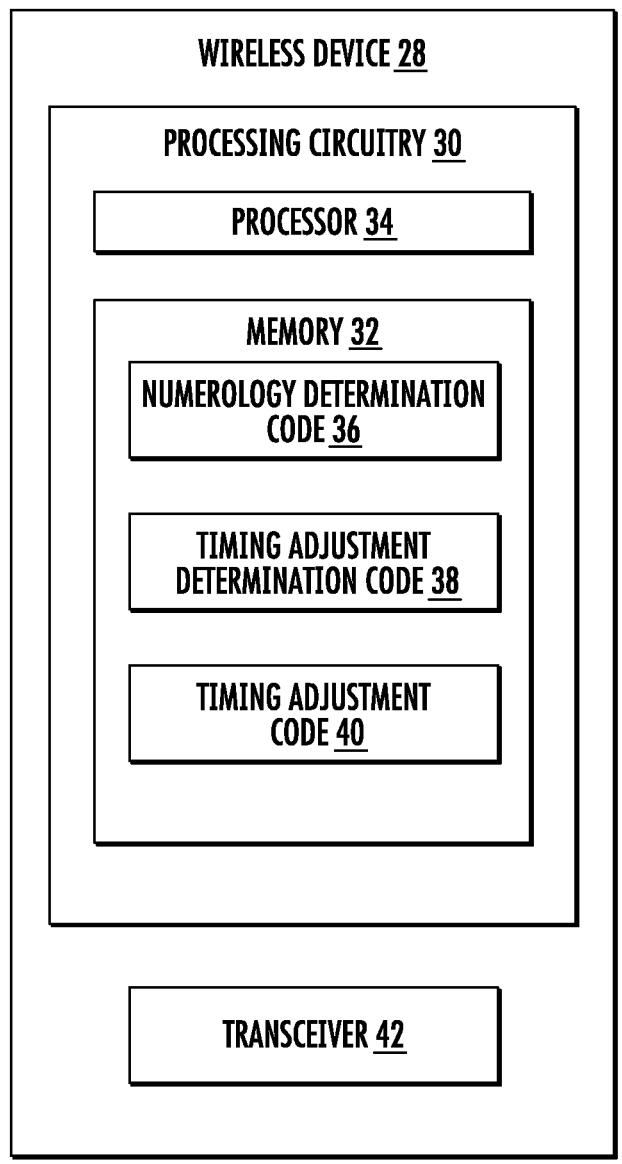
FIG. 8 is a block diagram of an exemplary wireless device in accordance with some embodiments.

FIG. 8 is a block of an exemplary wireless device 28 in accordance with the disclosure. Wireless device 28 includes processing circuitry 30. Processing circuitry 30 includes memory 32 and processor 34. In addition to a traditional processor and memory, processing circuitry 30 may comprise integrated circuitry for processing and/or control, e.g., one or more processors and/or processor cores and/or FPGAs (Field Programmable Gate Array) and/or ASICs (Application Specific Integrated Circuitry). Processor 34 may be configured to access (e.g., write to and/or reading from) memory 32, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 32 may be configured to store code executable by processor 34 and/or other data, e.g., data pertaining to communication, e.g., configuration and/or address data of nodes, etc.

Processing circuitry 30 may be configured to control any of the methods and/or processes described herein and/or to cause such methods and/or processes to be performed, e.g., by wireless device 28. Processor 34 corresponds to one or more processors for performing wireless device 28 functions described herein. Wireless device 28 includes memory 32 that is configured to store data, programmatic software code and/or other information described herein. In one or more embodiments, memory 32 is configured to store numerology determination code 36 that, when executed by the processor 34, causes the processor to obtain at least a first numerology parameter, Pn1, associated with the numerology of uplink signal transmitted by the wireless device. The memory 32 further includes timing adjustment parameter determination code 38 that causes the processor 34 to determine at least a first timing adjustment parameter, Pt1, related to an amount of transit timing adjustment to be applied by the wireless device 28 for transmitting uplink signals, Pt1 being associated with Pn1. The memory 32 further includes a timing adjustment code 40 that causes the processor 34 to apply the determined Pt1 to adjust the uplink transmit timing of the uplink signals to be transmitted by the wireless device 28. Memory 32 is also configured to store Pt1 and Pn1. A transceiver 42 is in communication with processing circuitry 30 and is arranged to transmit communication signals from wireless device 28 and receive communication signals sent to wireless device 28. Although transceiver 42 is shown as a single unit, it is understood that implementations are not limited solely to such an arrangement. It is contemplated that separate physical receivers and transmitters can be used. In one embodiment. The transceiver 42 is configured receive Pn1.

In an alternative embodiment, the timing adjustment parameter determination code 38 is configured to determine at least a first timing adjustment parameter based on at least a first numerology parameter. In some embodiments, the first timing adjustment parameter is determined autonomously by the wireless device 28, as described below. The timing adjustment code 40 is configured to adjust the timing of an uplink transmission based on the first timing adjustment parameter.

Figure 9:
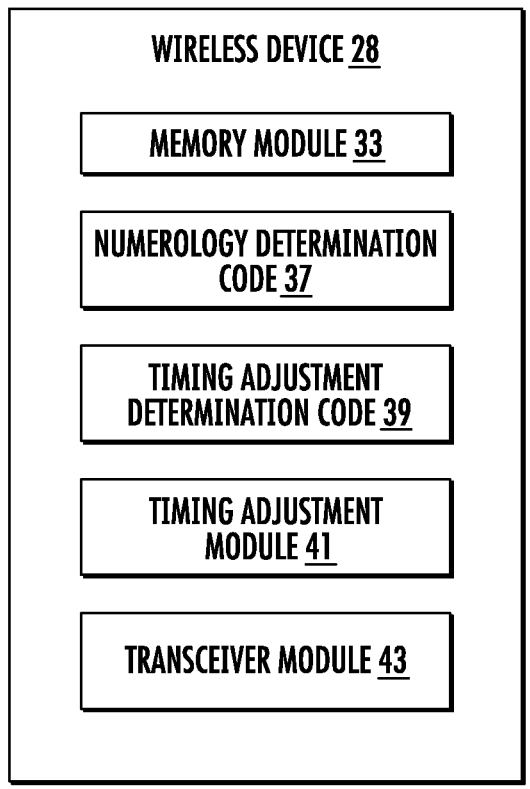
FIG. 9 is a block diagram of an alternative embodiment of a wireless device that operates in accordance with some embodiments.

FIG. 9 is a block diagram of an alternative embodiment of a wireless device 28, that includes a memory module 33 configured to store Pt1 and Pn1. The wireless device 28 may also include a numerology determination module 37 configured to obtain at least a first numerology parameter, Pn1, associated with the numerology of uplink signal transmitted by the wireless device. The wireless device 28 also includes a timing adjustment determiner module 39 configured to determine at least a first timing adjustment parameter, Pt1, related to an amount of transit timing adjustment to be applied by the wireless device for transmitting uplink signals, Pt1 being associated with Pn1. The wireless device 28 also includes a timing adjustment module 41 configured to apply the determined Pt1 to adjust the uplink transmit timing of the uplink signals to be transmitted by the wireless device. The wireless device 28 also includes a transceiver module 43 configured to transmit uplink signals according to the adjusted transmit timing.

In an embodiment, the timing adjustment parameter determination module 39 is configured to determine at least a first timing adjustment parameter based on at least a first numerology parameter. The timing adjustment module 41 is configured to adjust the timing of an uplink transmission based on the first timing adjustment parameter. In some embodiments, the first timing adjustment parameter is determined autonomously by the wireless device 28.

Figure 10:
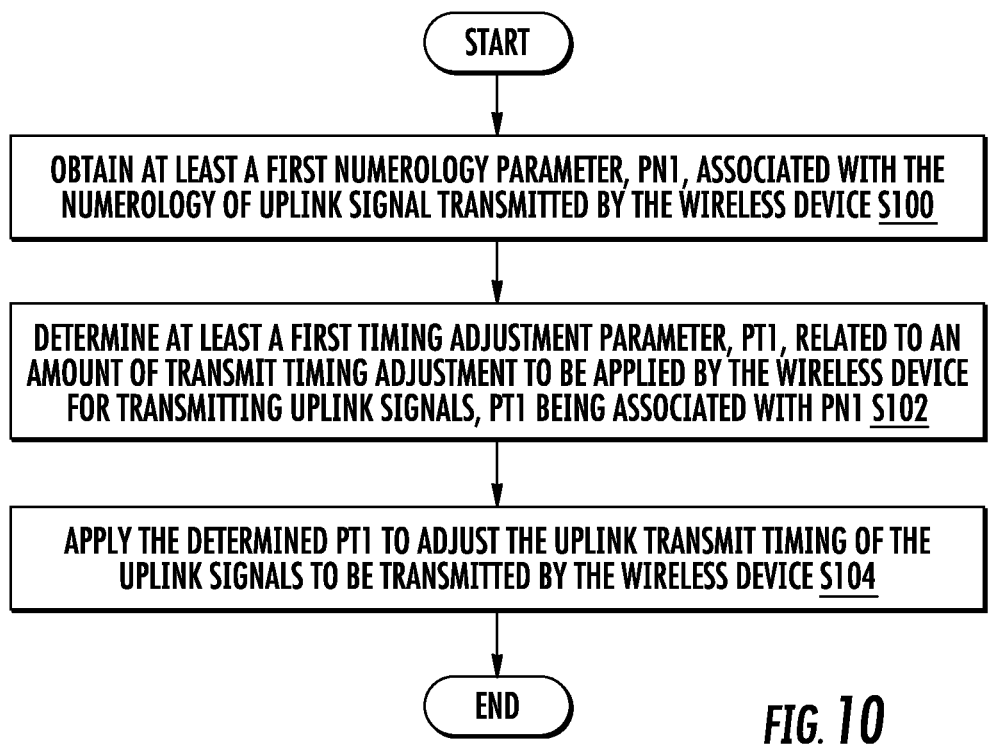
FIG. 10 is a flowchart of an exemplary autonomous timing adjustment process in accordance with some embodiments.

FIG. 10 is a flowchart of an exemplary process of adjusting a timing of transmissions in a wireless device 28. The process may be performed by the processing circuitry 30 or modules 37, 39, 41 and 43, and includes obtaining at least a first numerology parameter, Pn1, associated with the numerology of uplink signal transmitted by the wireless device 28 (block S100). The process also includes determining at least a first timing adjustment parameter, Pt1, related to an amount of transit timing adjustment to be applied by the wireless device 28 for transmitting uplink signals, Pt1 being associated with Pn1 (block S102). The process also includes applying the determined Pt1 to adjust the uplink transmit timing of the uplink signals to be transmitted by the wireless device (block S104).

Figure 11:
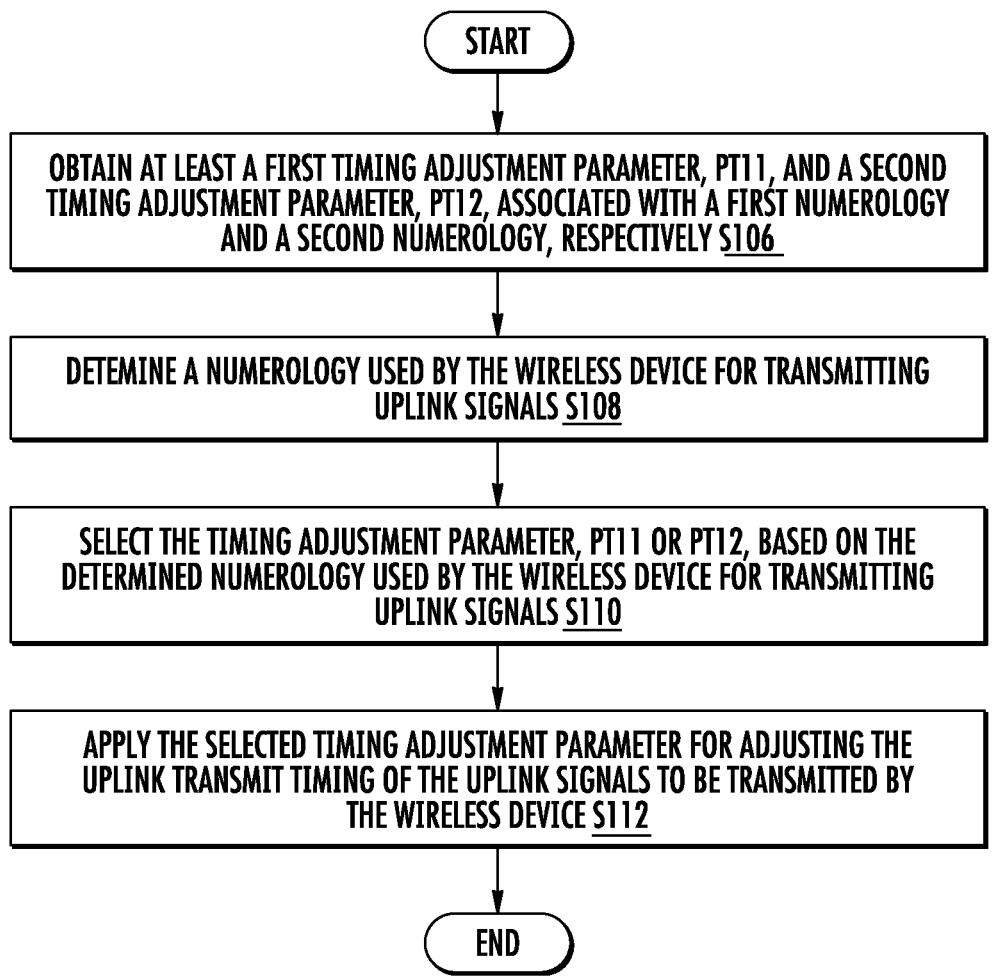
FIG. 11 is a flow diagram of another exemplary autonomous timing adjustment process in accordance with some embodiments.

FIG. 11 is a flowchart of an alternative process of adjusting a timing of transmissions in a wireless device 28. The process may be performed by the processing circuitry 30 or modules 37, 39, 41 and 43, and includes obtaining at least a first timing adjustment parameter, Pt11, and a second timing adjustment parameter, Pt12, associated with a first numerology and a second numerology, respectively (block S106). The process also includes determining a numerology used by the wireless device 28 for transmitting uplink signals (block S108). The process also includes selecting the timing adjustment parameter, Pt11 or Pt12, based on the determined numerology used by the wireless device for transmitting uplink signals (block S110). The process also includes applying the selected timing adjustment parameter for adjusting the uplink transmit timing of the uplink signals to be transmitted by the wireless device 28 (block S112).

Figure 12:
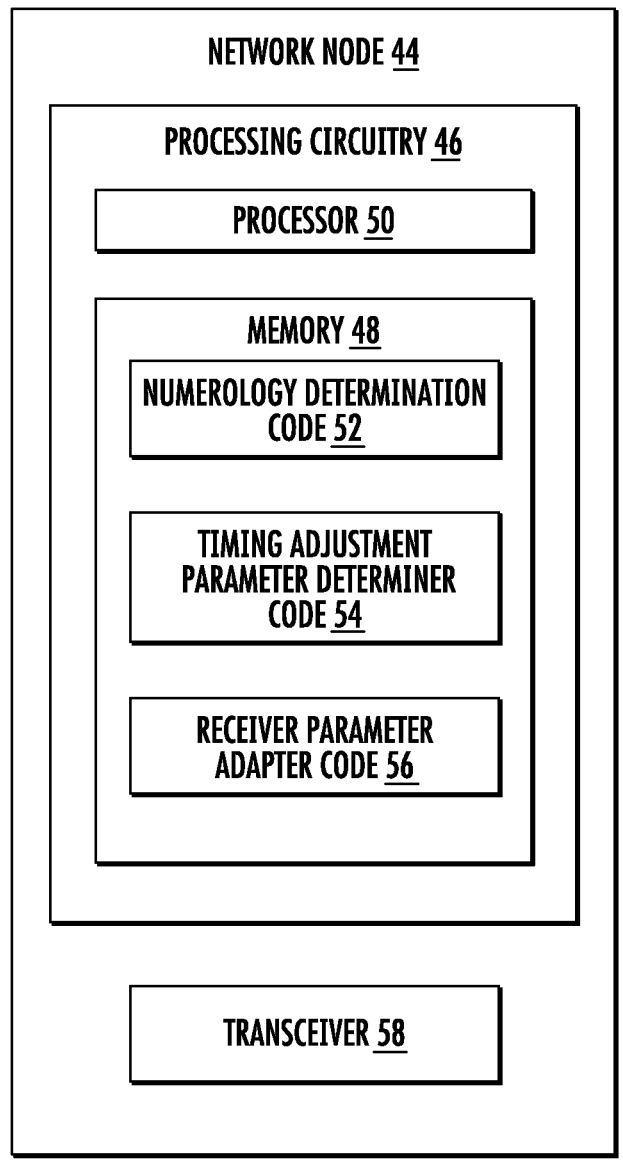
FIG. 12 is a block diagram of an exemplary network node in accordance with some embodiments.

FIG. 12 is a block of an exemplary network node 44. Network node 44 includes processing circuitry 46. Processing circuitry 46 includes memory 48 and processor 50. In addition to a traditional processor and memory, processing circuitry 46 may comprise integrated circuitry for processing and/or control, e.g., one or more processors and/or processor cores and/or FPGAs (Field Programmable Gate Array) and/or ASICs (Application Specific Integrated Circuitry). Processor 50 may be configured to access (e.g., write to and/or reading from) memory 48, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 48 may be configured to store code executable by processor 50 and/or other data, e.g., data pertaining to communication, e.g., configuration and/or address data of nodes, etc.

Processing circuitry 46 may be configured to control any of the methods and/or processes described herein and/or to cause such methods and/or processes to be performed, e.g., by network node 44. Processor 50 corresponds to one or more processors for performing network node 44 functions described herein. Network node 44 includes memory 48 that is configured to store data, programmatic software code and/or other information described herein. In one or more embodiments, numerology determination code 52, when executed by the processor 50, causes the processor to determine a numerology used by the wireless device for transmitting uplink signals. The timing adjustment parameter determiner code 54 causes the processor to obtain at least a first timing adjustment parameter (Pt1) associated with the determined numerology used for transmitting the signals. Receiver parameter adapter code 56 causes the processor to adapt at least one parameter of a receiver of the network node based on the determined at least one first timing adjustment parameter. The transceiver 58 includes a transmitter configured to transmit the determined value of Pt1 to the wireless device 20. The transceiver 58 is in communication with processing circuitry 46 and is arranged to transmit communication signals from network node 44 and receive communication signals sent to network node 44. Although transceiver 56 is shown as a single unit, it is understood that implementations are not limited solely to such an arrangement. It is contemplated that separate physical receivers and transmitters can be used.

In an embodiment, the timing adjustment parameter determiner code 54 causes the processor to determine at least a first timing adjustment parameter based on at least a first numerology parameter, the first timing adjustment parameter related to an amount of transmit timing adjustment to be applied by a wireless device 28 for transmitting an uplink signal. The receiver parameter adapter code 56 causes the processor to adapt at least one parameter of a receiver of the network node 44 based on the determined at least one first timing adjustment parameter.

Figure 13:
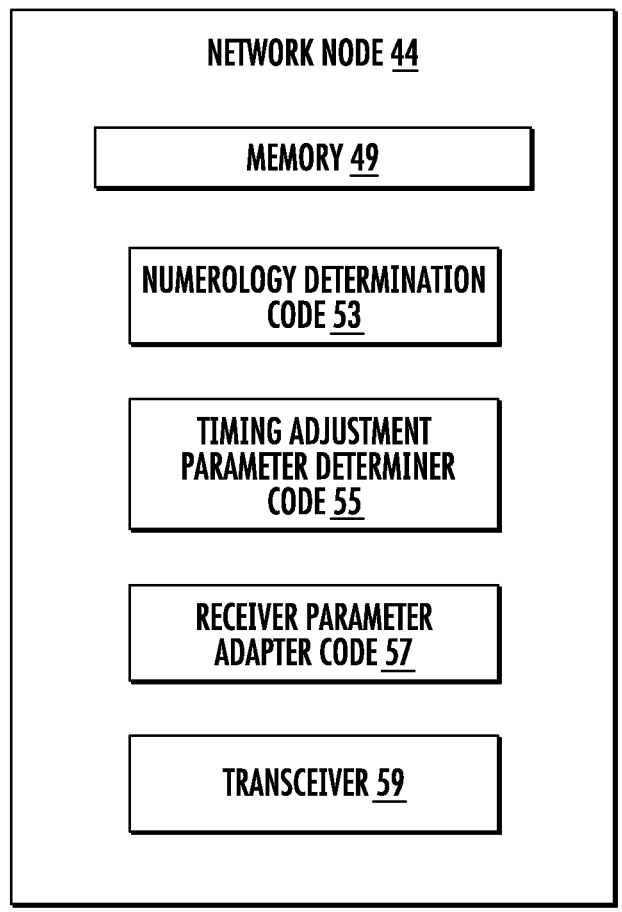
FIG. 13 is a block diagram of an alternative embodiment of a network node constructed in accordance with some embodiments.

FIG. 13 is a block diagram of an alternative network node 44 that includes a memory module 49. A numerology determiner module 53 is configured to determine a numerology used by the wireless device for transmitting uplink signals. A timing adjustment parameter determiner module 55 is configured to obtain at least a first timing adjustment parameter (Pt1) associated with the determined numerology used for transmitting the signals. A receiver parameter adapter module 57 causes the processor to adapt at least one parameter of a receiver of the network node based on the determined at least one first timing adjustment parameter timing adjustment parameter A transceiver module 59 is configured to transmit the determined value of Pt1 to the wireless device.

In another embodiment, the timing adjustment parameter determiner module 55 is configured to determine at least a first timing adjustment parameter based on at least a first numerology parameter, the first timing adjustment parameter related to an amount of transmit timing adjustment to be applied by a wireless device 28 for transmitting an uplink signal. The receiver parameter adapter module 57 is configured to adapt at least one parameter of a receiver of the network node 44 based on the determined at least one first timing adjustment parameter.

Figure 14:
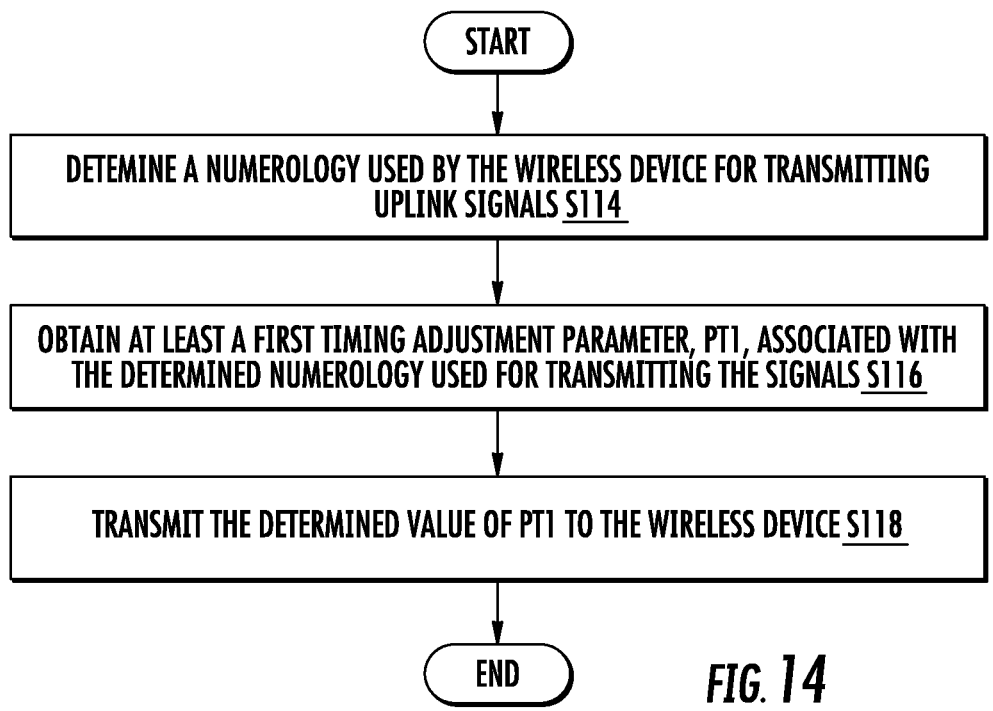
FIG. 14 is a flow chart of an exemplary parameter adjustment process for a receiver or communication interface of network node in accordance with some embodiments.

FIG. 14 is a flowchart of an exemplary process in a network node for adjusting timing of uplink transmissions of a wireless device. The process includes determining a numerology used by the wireless device for transmitting uplink signals (block S114). The process also includes obtaining at least a first timing adjustment parameter, Pt1, associated with the determined numerology used for transmitting the signals (block S116). The process also includes transmitting the determined value of Pt1 to the wireless device (block S118).

Figure 15:
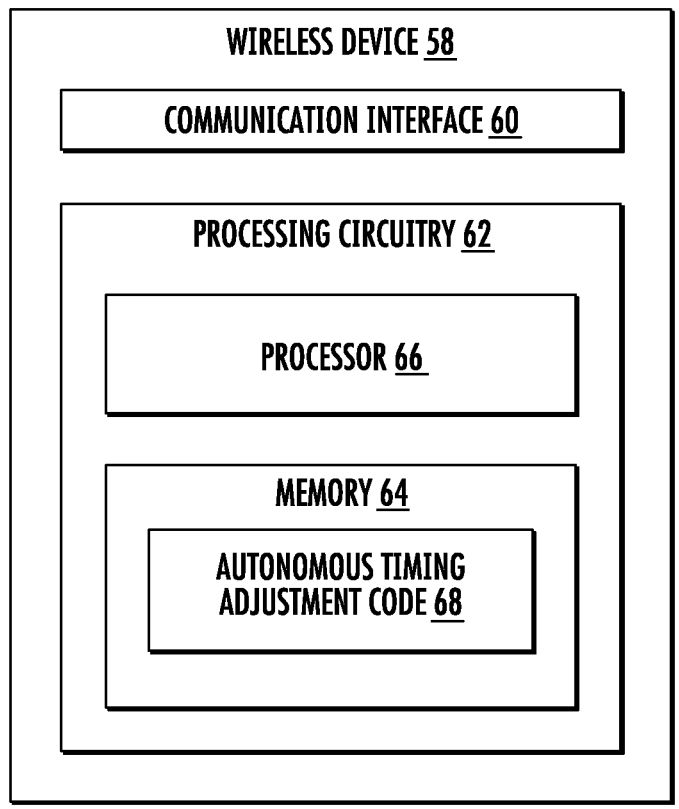
FIG. 15 is a block diagram of another exemplary wireless device in accordance with some embodiments.

FIG. 15 is a block of an exemplary wireless device 58 in accordance with the principles of the disclosure. Wireless device 58 includes one or more communication interfaces 60 for communicating with one or more other wireless devices 58, network nodes 44, and/or other elements in system 22. In one or more embodiments, communication interface 60 includes one or more transmitters and/or one or more receivers. Wireless device 58 includes processing circuitry 62. Processing circuitry 62 includes processor 66 and memory 64. In addition to a traditional processor and memory, processing circuitry 62 may comprise integrated circuitry for processing and/or control, e.g., one or more processors and/or processor cores and/or FPGAs (Field Programmable Gate Array) and/or ASICs (Application Specific Integrated Circuitry). Processor 66 may be configured to access (e.g., write to and/or reading from) memory 64, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 64 may be configured to store code executable by processor 66 and/or other data, e.g., data pertaining to communication, e.g., configuration and/or address data of nodes, etc.

Processing circuitry 62 may be configured to control any of the methods and/or processes described herein and/or to cause such methods and/or processes to be performed, e.g., by wireless device 58. Processor 66 corresponds to one or more processors for performing wireless device 58 functions described herein. Wireless device 58 includes memory 64 that is configured to store data, programmatic software code and/or other information described herein.

In one or more embodiments, memory 64 is configured to store autonomous timing adjustment code 68. For example, autonomous timing adjustment code 68 includes instructions that, when executed by processor 66, causes processor 66 to perform the process discussed in detail with respect to FIGS. 16 and 17 and embodiments discussed herein.

Figure 16:
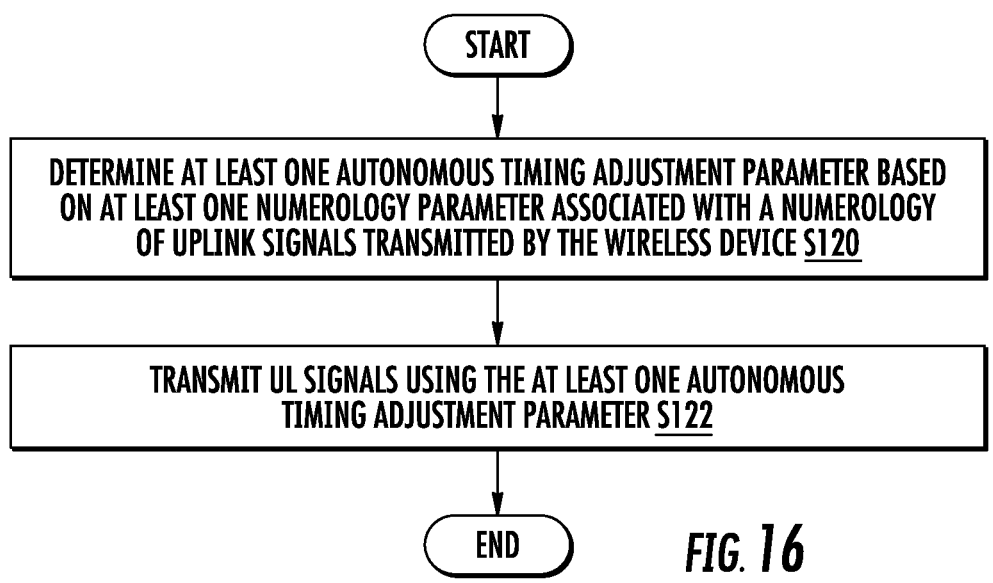
FIG. 16 is a flowchart of an exemplary process for autonomous timing adjustment.

FIG. 16 is a flow diagram of an exemplary autonomous timing adjustment process in accordance with the principles of the disclosure. Processing circuitry 62 determines at least one autonomous timing adjustment parameter based on at least one numerology parameter associated with a numerology of uplink, UL, signals transmitted by wireless device 58 (Block S120). The at least one numerology parameter is discussed below. Processing circuitry 62 transmits UL signals using the at least one autonomous timing adjustment parameter (Block S122).

Figure 17:
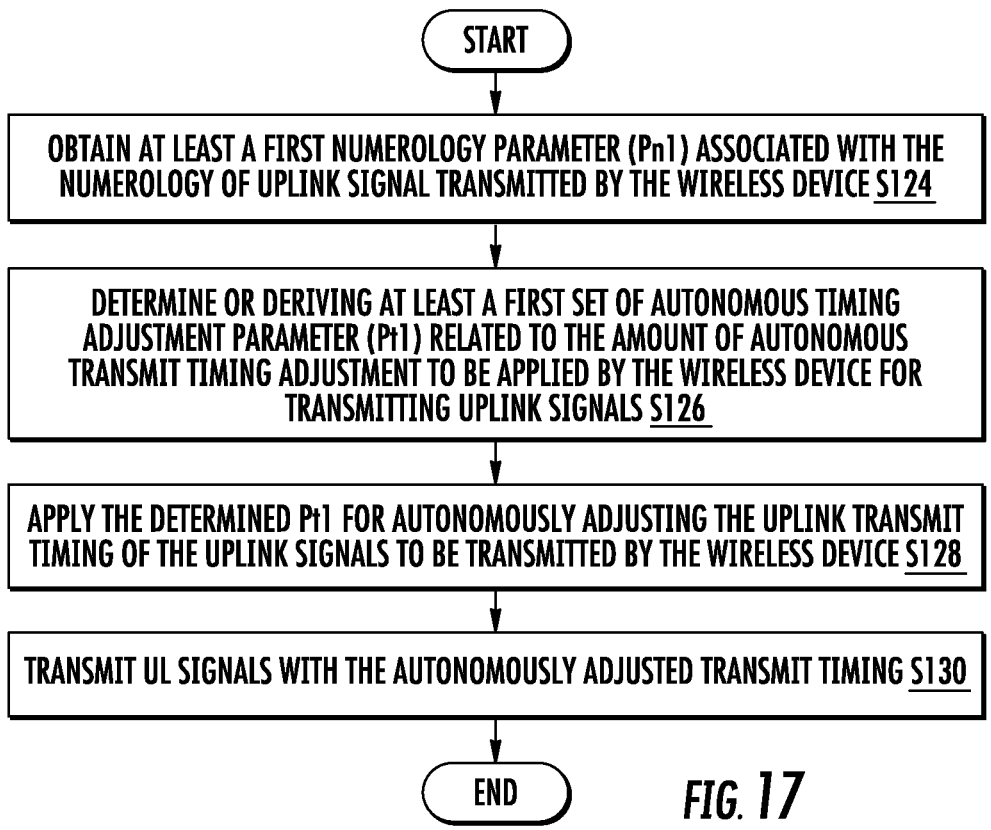
FIG. 17 is a flowchart of another exemplary process for autonomous timing adjustment.

FIG. 17 is a flow diagram of another exemplary autonomous timing adjustment process in accordance with the principles of the disclosure. Processing circuitry 62 obtains at least a first numerology parameter (Pn1) associated with the numerology of uplink signal transmitted by wireless device 58 (Block S124). Processing circuitry 62 determines or derives at least a first set of autonomous timing adjustment parameter (Pt1) related to the amount of autonomous transmit timing adjustment to be applied by wireless device 58 for transmitting uplink signals (Block S126). Processing circuitry 62 applies the determined Pt1 for autonomously adjusting the uplink transmit timing of the uplink signals to be transmitted by wireless device 58 (Block S128). Processing circuitry 62 transmits UL signals with the autonomously adjusted transmit timing (Block S130).

In one or more embodiments, wireless device 58 will determine an amount of timing adjustment for uplink transmissions dependent on the numerology used on the carrier. So wireless device 58 may apply a first timing adjustment for a first numerology and a second timing adjustment for a second numerology. It may be so that wireless device 58 applies a smaller timing adjustment if the TTI duration is small while wireless device 58 applies a larger timing adjustment if the TTI duration is large.

One or More Methods for Adjusting Autonomous Transmission Timing Adjustment

It will herein be described how wireless device 58 adjusts an autonomous uplink transmission timing mechanism based on the numerology. The following example aspects of the mechanism may be adjusted based on the numerology:

(1) The maximum adjustment amount of one adjustment step.
(2) Frequency of timing adjustment steps.
(3) Minimum aggregated adjustment rate.
(4) Maximum aggregated adjustment rate.
(5) Timing error limit.

Maximum Autonomous Adjustment Step Size (1)

The magnitude of the maximum amount of one adjustment step may depend on at least the numerology used by wireless device 58 for transmitting uplink signals. With a first numerology wireless device 58 may apply a first adjustment step size Ts1, while with another numerology wireless device 58 may apply a second step size Ts2. For example, the magnitude of the maximum amount of one adjustment step may be smaller for larger subcarrier spacing compared to that for smaller subcarrier spacing.

This ensures that wireless device 58 does not apply a timing adjustment step size which is too large/small for the numerology. If a too large step size is used by wireless device 26 then the receiver performance in the radio network node (e.g., gNB) may be degraded since the uplink transmission from wireless device 58 may not be decoded correctly by the network node (e.g. gNB) and/or interference may be created. However, with a too small step size wireless device 26 may need to perform many adjustment steps to ensure an accurate uplink transmission timing. Larger number of adjustment in wireless device 58 may drain its battery and would also require more complex and more frequent processing.

Frequency of the Timing Adjustment Considering the Numerology (2)

The autonomous transmission timing adjustment may be modified by adjusting the frequency with which wireless device 58 updates the transmission timing. For example, by applying a frequency with which wireless device 58 adjusts the uplink transmission timing and the frequency or periodicity of the timing adjustment may depend on numerology of the carrier frequency on which the signal is transmitted by wireless device 58, e.g., more frequent for a first numerology (or group of numerologies) and less frequent for a second numerology (or group of numerologies). In addition, it may further depend on the timing adjustment step size, which in turn depends on the numerology of the carrier on which the signal is transmitted by wireless device 58.

Maximum/Minimum Aggregated Adjustment Rate (3)/(4)

The aggregated adjustment rate applied by wireless device 58 dictates the rate at which wireless device 58 updates the uplink transmission timing. This may be expressed as how much wireless device 58 may adjust the timing during a period. This may depend on the numerology, such that with a numerology with a larger subcarrier spacing wireless device 58 applied a larger adjustment rate, while with a smaller subcarrier spacing wireless device 58 applies a smaller adjustment rate. A smaller maximum adjustment rate ensures that wireless device 58 does not change the uplink transmission timing too quickly since that may result in that the radio network node (e.g., gNB) cannot track the wireless device 58's uplink transmissions, while a limit on the minimum adjustment rate ensures that the wireless device 58's uplink transmission timing does not become unsynchronized in the radio network node (e.g., gNB). Since the time-window in the radio network node (e.g., gNB) within which the wireless device 58's uplink signals need to be received may depend on the numerology, it is beneficial if the maximum/minimum aggregated adjustment rate is adjusted based on the numerology.

Timing Error Limit Considering Numerologies (5)

Wireless device 58 may apply a different timing error limit for transmissions depending on the numerology associated with the transmission. Wireless device 58 may then have one associated timing error limit (TEL1) to numerology 1 (NUM1) and another timing error limit (TEL2) associated with a numerology 2 (NUM2). The timing error limit may dictate how much an acceptable/allowed timing error is for transmissions. If the timing error limit is not met wireless device 58 may be required to perform autonomous UL transmission timing adjustments as described above.

The benefit of having a numerology-dependent timing error limit is for example that for some numerologies it is acceptable that there is a certain (relatively large) timing error and hence wireless device 58 does not need to perform autonomous transmission timing adjustments very frequent and wireless device 58 may therefore save power. However, for some other numerologies it may be more critical to have a small timing error and hence wireless device 58 shall apply the autonomous transmission timing adjustment in a way that the error is kept smaller.

In general, the Timing Error Limit may be a function of the numerology:

Timing Error Limit=$f$(NUM)

Wireless device 58 would determine which numerology this transmission is associated with, and based on this determine which timing error limit is associated to this transmission.

It may also be so that wireless device 58 considers both the bandwidth and the numerology associated with the transmission when determining the timing error limit. It may be so that wireless device 58 considers only the downlink bandwidth and/or only the uplink bandwidth in the above. In other words, the Timing error limit would be a function of both the numerology and the bandwidth:

Timing Error Limit=$f$(NUM,Bandwidth)

It should be noted that wireless device 58 may (given the same numerology) apply the same timing error limit for a set of bandwidth, e.g. for all bandwidths above 3 MHz wireless device 58 may apply the same timing error limit.

Autonomous Adjustment Under Different UL and DL Numerologies

Any one or more of the autonomous timing adjustment parameters (e.g. magnitude of the maximum amount of one adjustment step, minimum and maximum adjustment rates etc.) may further depend on the numerology of the downlink signals received by wireless device 58 from the network node, in addition to the numerology of the uplink signals transmitted by wireless device 58. This is because the accuracy of the uplink timing adjustment, which is based on downlink reception timing of the received signals, may be affected by the accuracy of the downlink signal reception. Any one or more of the autonomous timing adjustment parameters for example may be determined based on any one or more of the following exemplary principles, which may be pre-defined or configured by the network node at wireless device 58:

In one example, the set of autonomous timing adjustment parameters may be defined for a set of DL and UL numerologies. This can be expressed for example in terms of pre-defined mapping between a set of autonomous timing adjustment parameters and UL and DL numerologies used by wireless device 58 in a cell.

In another example, the set of autonomous timing adjustment parameters may be based on DL or on UL numerologies depending on the relation between the DL or on UL numerologies. For example, if UL subcarrier spacing is larger than the downlink then the one or more set of parameters are based on UL numerology (e.g. UL subcarrier spacing). Otherwise wireless device 58 may use one or more set of parameters are based on any of UL or DL numerologies.

In yet another example the magnitude of the maximum amount of one adjustment step may be defined as a function of one or more parameters associated with DL and UL numerologies. Examples of functions are maximum, maximum, average etc. For example, assuming minimum function wireless device 58 may use the smallest value of the adjustment step sizes corresponding to the UL and DL numerologies. For example, if UL and DL subcarrier spacings used in a cell are 15 KHz and 30 KHz respectively, then based on the minimum function wireless device 58 may apply adjustment step corresponding to subcarrier spacing of 30 KHz i.e. 3.5/2 Ts.

EXAMPLES

An example of wireless device 58 autonomous adjustment of the transmit timing applied by wireless device 58 is shown below in Table 5.

TABLE 5

Magnitude of autonomous adjustment of the UL transmit timing as function of numerology (e.g., subcarrier spacing) for the same cell BW

| No. | Subcarrier spacing (KHz) | DL Bandwidth | Maximum autonomous adjustment step size (Ts) | Minimum aggregated adjustment rate (Ts/second) | Maximum aggregated adjustment rate (Ts/200 ms) | Timing error limit |
|---|---|---|---|---|---|---|
| 1 | 15 | 1.4 MHz | 3.5 | 7 | 1 | 24*Ts |
| 2 | 15 | >3 MHz | 3.5 | 7 | 1 | 12*Ts |

TABLE 5-continued

Magnitude of autonomous adjustment of the UL transmit timing as function of numerology (e.g., subcarrier spacing) for the same cell BW

| No. | Subcarrier spacing (KHz) | DL Bandwidth | Maximum autonomous adjustment step size (Ts) | Minimum aggregated adjustment rate (Ts/second) | Maximum aggregated adjustment rate (Ts/200 ms) | Timing error limit |
|---|---|---|---|---|---|---|
| 3 | 30 | 1.4 MHz | 3.5/2 | 7/2 | 1/2 | 24*Ts/2 |
| 4 | 30 | >3 MHz | 3.5/2 | 7/2 | 1/2 | 12*Ts/2 |
| 5 | 45 | 1.4 MHz | 3.5/3 | 7/3 | 1/3 | 24*Ts/3 |
| 6 | 45 | >3 MHz | 3.5/3 | 7/3 | 1/3 | 12*Ts/3 |
| 7 | 60 | 1.4 MHz | 3.5/4 | 7/4 | 1/4 | 24*Ts/4 |
| 8 | 60 | >3 MHz | 3.5/4 | 7/4 | 1/4 | 12*Ts/4 |

The autonomous adjustment is based on the DL reception timing and is limited by associated parameters (e.g. maximum amount of the magnitude of the autonomous timing adjustment step size, minimum aggregated timing adjustment rate, maximum aggregated timing adjustment rate, timing error limit, etc.).

Figure 18:
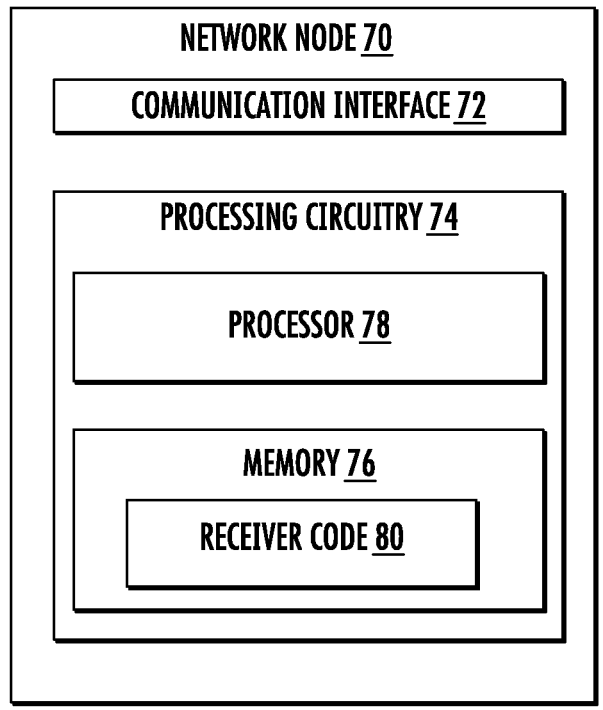
FIG. 18 is a block diagram of an alternative network node constructed in accordance with some embodiments.

Adaptation of Receiver at Network Node Based on Autonomous Adjustment Parameters Associated with Numerology FIG. 18 is a block of an exemplary network node 70 in accordance with the principles of the disclosure. Network node 70 includes one or more communication interfaces 72 for communicating with one or more other network nodes 70, wireless devices 58, and/or other elements in system 22. In one or more embodiments, communication interface 72 includes one or more transmitters and/or one or more receivers. Network node 70 includes processing circuitry 74. Processing circuitry 74 includes processor 78 and memory 76. In addition to a traditional processor and memory, processing circuitry 74 may comprise integrated circuitry for processing and/or control, e.g., one or more processors and/or processor cores and/or FPGAs (Field Programmable Gate Array) and/or ASICs (Application Specific Integrated Circuitry). Processor 78 may be configured to access (e.g., write to and/or reading from) memory 76, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 76 may be configured to store code executable by processor 78 and/or other data, e.g., data pertaining to communication, e.g., configuration and/or address data of nodes, etc.

Processing circuitry 74 may be configured to control any of the methods and/or processes described herein and/or to cause such methods and/or processes to be performed, e.g., by network node 70. Processor 78 corresponds to one or more processors for performing network node 70 functions described herein. Network node 70 includes memory 76 that is configured to store data, programmatic software code and/or other information described herein. In one or more embodiments, memory 76 is configured to store receiver code 80. For example, receiver code 80 includes instructions that, when executed by processor 78, causes processor 78 to perform the process discussed in detail with respect to FIG. 12 and embodiments discussed herein.

Figure 19:
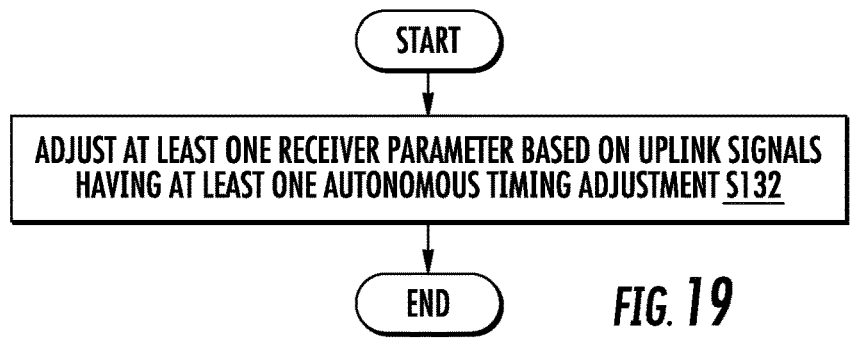
FIG. 19 is a flowchart of another exemplary process for autonomous timing adjustment.

FIG. 19 is a flow diagram of an exemplary parameter adjustment process for a receiver or communication interface 72 of network node 70. Processing circuitry 74 adjust at least one receiver parameter based on uplinks signals having at least one autonomous timing adjustment (Block S132). According to one or more other embodiments, the network node receiving signals from wireless device 58 may also adapt one or more parameters associated with its receiver for receiving signals from wireless device 58 as discussed above with respect to Block S132. The adaptation of the receiver may be based on at least the set of autonomous timing adjustment parameters used by wireless device 58 for transmitting signals and that are derived by wireless device 58 based on at least the numerology used in the uplink. Examples of receiver parameters that can be adapted are processing resources, memory resources, time window for UL channel estimation, size of IFFT, RF filter characteristics (e.g., extent to which received signal can be amplified etc.), etc. For example, if the autonomous adjustment size is smaller (e.g., due to larger subcarrier spacing in UL) then the network node may estimate channel over shorter time period and may also require less post processing resources for decoding UL received signals from wireless device 58.

Figure 20:
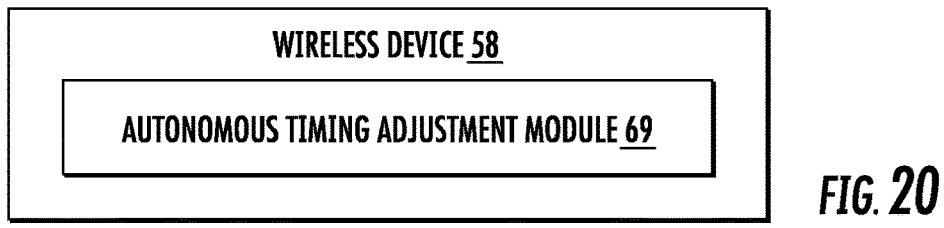
FIG. 20 is a block diagram of an alternative wireless device constructed in accordance with some embodiments.

FIG. 20 is a block diagram of another exemplary wireless device 58 in accordance with the principles of the disclosure. Wireless device 58 includes autonomous adjustment processing module 69 that is configured to perform the autonomous timing adjustment process discussed herein such as with respect to FIGS. 16-17, and other examples and embodiments discussed herein.

Figure 21:
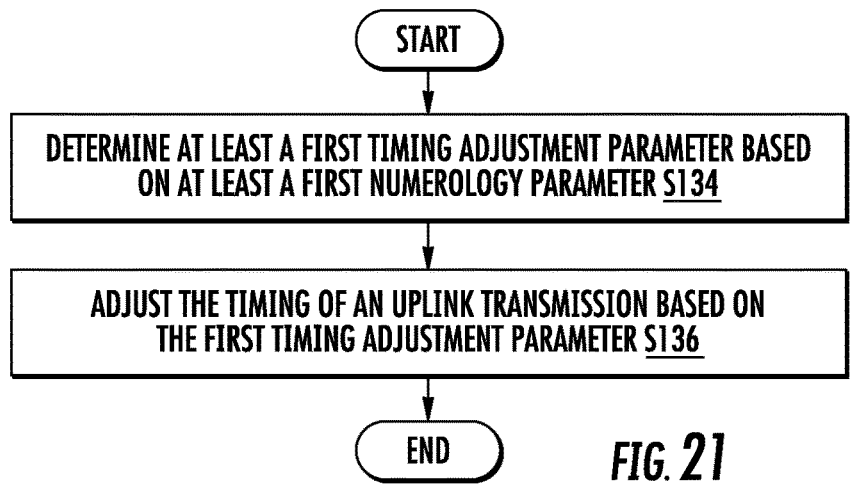
FIG. 21 is a flowchart of still another exemplary process for autonomous timing adjustment.

FIG. 21 is a flowchart of an exemplary process in a wireless device of adjusting the timing of transmissions. The process includes determining, via the wireless device timing adjustment parameter determination code 38, at least a first timing adjustment parameter based on at least a first numerology parameter (block S134) as described above at least with reference to FIG. 8 and FIG. 9 based on at least the embodiments described above for determining timing adjustment parameters. The process also includes adjusting, via the timing adjustment code 40, the timing of an uplink transmission based on the first timing adjustment parameter (block S136).

Figure 22:
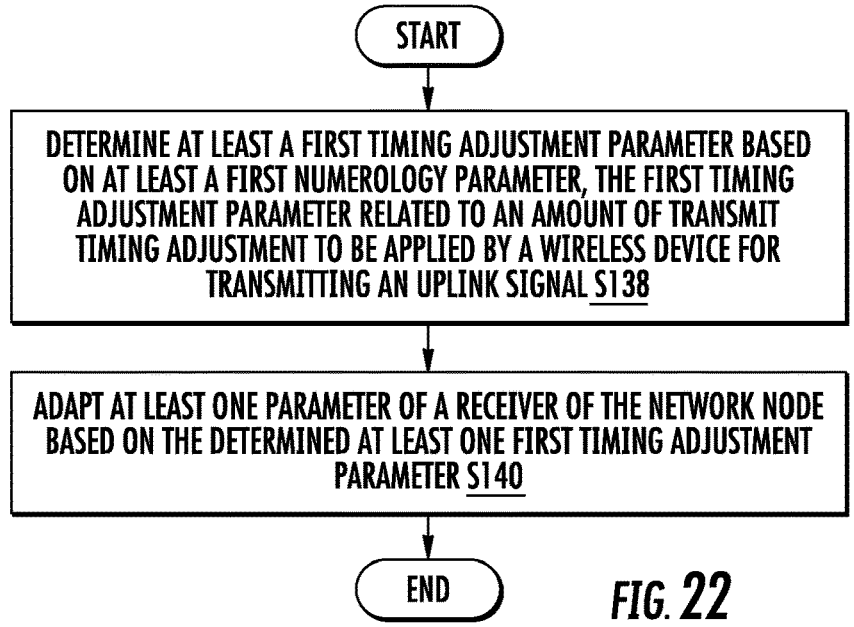
FIG. 22 is as flowchart of an exemplary process for adjusting the timing of received signals.

FIG. 22 is a flowchart of an exemplary process in a network node for adjusting the timing of received signals. The process includes determining, via the network node timing adjustment parameter determining code 54, at least a first timing adjustment parameter based on at least a first numerology parameter, the first timing adjustment parameter related to an amount of transmit timing adjustment to be applied by a wireless device for transmitting an uplink signal (block S138). The process also includes adapting, via the receiver parameter adapter code 56, at least one parameter of a receiver of the network node based on the determined at least one first timing adjustment parameter (block S140).

In some embodiments, a method in a wireless device 28 of adjusting timing of transmissions is provided. The method includes determining at least a first timing adjustment parameter based on at least a first numerology parameter S134. The method also includes adjusting the timing of an uplink transmission based on the first timing adjustment parameter S136.

In some embodiments, the method further includes transmitting the uplink signals according to the adjusted uplink transmit timing. In some embodiments, the uplink transmit timing adjustment is based on at least one of a characteristic of an uplink signal, a characteristic of a downlink signal and numerology parameters. In some embodiments, the first numerology parameter is a maximum adjustment amount of one adjustment step based on a subcarrier spacing. In some embodiments, the first numerology parameter is a frequency of a timing adjustment based on a carrier frequency of the uplink transmission. In some embodiments, the first numerology parameter is an aggregate adjustment rate at which the wireless device 28 updates an uplink transmission timing, the aggregate adjustment rate being based on a subcarrier spacing. In some embodiments, the method further includes determining a second timing adjustment parameter based on a second numerology parameter; determining a numerology to be used by the wireless device 28 for uplink transmissions; selecting one of the first timing adjustment parameter and the second timing adjustment parameter based on the determined numerology; and applying the selected one of the first and second timing adjustment parameters to adjust the timing of an uplink transmission. In some embodiments, the first timing adjustment parameter is based on a determined uplink numerology and a second timing adjustment parameter is based on a determined downlink numerology. In some embodiments, the first timing adjustment parameter is determined autonomously by the wireless device 28. In some embodiments, the first timing adjustment parameter is determined based on one of a rule and a predefined value received from a network node 44. In some embodiments, the first timing adjustment parameter is further determined based on one of an uplink bandwidth and a downlink bandwidth. In some embodiments, the first timing adjustment parameter is a timing advance command received from a network node. In some embodiments, the first and/or second numerology parameter comprises one or more of: frame duration, subframe duration, transmission time interval (TTI) duration, slot duration, symbol duration and number of symbols per slot and subframe, subcarrier spacing, sampling frequency, fast Fourier transform (FFT) size, number of subcarriers per resource Block (RB), number of RBs within the bandwidth, and cyclic prefix length.

In some embodiments, a wireless device 28 configured for adjusting timing of transmissions is provided. The wireless device 28 includes processing circuitry 30 configured to: determine at least a first timing adjustment parameter based on at least a first numerology parameter; and adjust the timing of an uplink transmission based on a first timing adjustment parameter.

In some embodiments, the processing circuitry 30 is further configured to transmit the uplink signals according to the adjusted uplink transmit timing. In some embodiments, the uplink transmit timing adjustment is based on at least one of a characteristic of an uplink signal, a characteristic of a downlink signal and numerology parameters. In some embodiments, the first numerology parameter is a maximum adjustment amount of one adjustment step based on a subcarrier spacing. In some embodiments, the first numerology parameter is a frequency of a timing adjustment based on a carrier frequency of the uplink transmission. In some embodiments, the first numerology parameter is an aggregate adjustment rate at which the wireless device 28 updates an uplink transmission timing, the aggregate adjustment rate being based on a subcarrier spacing. In some embodiments, the processing circuitry is further configured to: determine a second timing adjustment parameter based on a second numerology parameter; determine a numerology to be used by the wireless device 28 for uplink transmissions; select one of the first timing adjustment parameter and the second timing adjustment parameter based on the determined numerology; and apply the selected one of the first and second timing adjustment parameters to adjust the timing of an uplink transmission. In some embodiments, the first timing adjustment parameter is based on a determined uplink numerology and a second timing adjustment parameter is based on a determined downlink numerology. In some embodiments, the first timing adjustment parameter is determined autonomously by the wireless device 28.

In some embodiments, the first timing adjustment parameter is determined based on one of a rule and a predefined value received from a network node 44. In some embodiments, the first timing adjustment parameter is further determined based on one of an uplink bandwidth and a downlink bandwidth. In some embodiments, the first timing adjustment parameter is a timing advance command received from a network node. In some embodiments, the first and/or second numerology parameter comprises one or more of: frame duration, subframe duration, transmission time interval (TTI) duration, slot duration, symbol duration and number of symbols per slot and subframe, subcarrier spacing, sampling frequency, fast Fourier transform (FFT) size, number of subcarriers per resource Block (RB), number of RBs within the bandwidth, and cyclic prefix length.

In some embodiments, a wireless device 28 configured for adjusting timing of transmissions is provided. The wireless device 28 includes a timing adjustment parameter determiner module 37 configured to determine at least a first timing adjustment parameter based on at least a first numerology parameter. The wireless device 28 further includes a timing adjustment module 41 configured to adjust the timing of an uplink transmission based on the first timing adjustment parameter.

In some embodiments, a method in a network node 44 for adjusting timing of received signals. The method includes determining at least a first timing adjustment parameter based on at least a first numerology parameter, the first timing adjustment parameter related to an amount of transmit timing adjustment to be applied by a wireless device 28 for transmitting an uplink signal. The method also includes adapting at least one parameter of a receiver of the network node 44 based on the determined at least one first timing adjustment parameter.

In some embodiments, the method further includes receiving uplink transmissions from the wireless device 28 using the adapted at least one parameter of the receiver. In some embodiments, the method further includes transmitting to the wireless device 28 a rule for determining the first timing adjustment parameter based on at least the first numerology. In some embodiments, the method further includes transmitting to the wireless device 28 a pre-defined value for determining the first timing adjustment parameter based on at least the first numerology. In some embodiments, the method further includes transmitting to the wireless device a first timing adjustment parameter based on at least the first numerology. In some embodiments, the first timing adjustment parameter is a timing advance command. In some embodiments, the first numerology parameter comprises one or more of: frame duration, subframe duration, transmission time interval (TTI) duration, slot duration, symbol duration and number of symbols per slot and subframe, subcarrier spacing, sampling frequency, fast Fourier transform (FFT) size, number of subcarriers per resource Block (RB), number of RBs within the bandwidth, and cyclic prefix length.

In some embodiments, a network node 44 for adjusting timing of received signals. The network node 44 includes processing circuitry 46 configured to determine at least a first timing adjustment parameter based on at least a first numerology parameter, the first timing adjustment parameter related to an amount of transmit timing adjustment to be applied by a wireless device 28 for transmitting an uplink signal. The processing circuitry 46 is further configured to adapt at least one parameter of a receiver 58 of the network node 44 based on the determined at least one first timing adjustment parameter.

In some embodiments, the processing circuitry 46 is further configured to receive uplink transmissions from the wireless device 28 using the adapted at least one parameter of the receiver 58. In some embodiments, the processing circuitry 46 is further configured to transmit to the wireless device 28 a rule for determining the first timing adjustment parameter based on at least the first numerology. In some embodiments, the processing circuitry 46 is further configured to transmit to the wireless device 28 a pre-defined value for determining the first timing adjustment parameter based on at least the first numerology. In some embodiments, the processing circuitry is further configured to transmit to the wireless device the first timing adjustment parameter based on at least the first numerology. In some embodiments, the first timing adjustment parameter is a timing advance command. In some embodiments, the first numerology parameter comprises one or more of: frame duration, subframe duration, transmission time interval (TTI) duration, slot duration, symbol duration and number of symbols per slot and subframe, subcarrier spacing, sampling frequency, fast Fourier transform (FFT) size, number of subcarriers per resource Block (RB), number of RBs within the bandwidth, and cyclic prefix length.

In some embodiments, a network node 44 for adjusting timing of received signals is provided. The network node 44 includes a timing adjustment parameter determiner module 55 configured to determine at least a first timing adjustment parameter based on at least a first numerology parameter, the first timing adjustment parameter related to an amount of transmit timing adjustment to be applied by a wireless device 28 for transmitting an uplink signal. The network node 44 further includes a receiver parameter adaptor module 57 configured to adapt at least one parameter of a receiver 58 of the network node 44 based on the determined at least one first timing adjustment parameter.

Some embodiments include:

Embodiment 1. A method of adjusting a timing of transmissions in a wireless device, the method comprising:
obtaining at least a first numerology parameter, Pn1, associated with the numerology of uplink signal transmitted by the wireless device;
determining at least a first timing adjustment parameter, Pt1, related to an amount of transit timing adjustment to be applied by the wireless device for transmitting uplink signals, Pt1 being associated with Pn1; and
applying the determined Pt1 to adjust the uplink transmit timing of the uplink signals to be transmitted by the wireless device.

Embodiment 2. The method of Embodiment 1, further comprising transmitting the uplink signals according to the adjusted uplink transmit timing.

Embodiment 3. The method of Embodiment 1, wherein the uplink transmit timing adjustment is based on at least one of a characteristic of an uplink signal, a characteristic of a downlink signal and numerology parameters.

Embodiment 4. A method of adjusting a timing of transmissions in a wireless device, the method comprising:
obtaining at least a first timing adjustment parameter, Pt11, and a second timing adjustment parameter, Pt12, associated with a first numerology and a second numerology, respectively;
determining a numerology used by the wireless device for transmitting uplink signals;
selecting the timing adjustment parameter, Pt11 or Pt12, based on the determined numerology used by the wireless device for transmitting uplink signals;
applying the selected timing adjustment parameter for adjusting the uplink transmit timing of the uplink signals to be transmitted by the wireless device.

Embodiment 5. The method of Embodiment 3, further comprising transmitting the uplink signals according to the adjusted uplink transmit timing.

Embodiment 6. A wireless device configured to adjust a timing of transmissions of the wireless device, the wireless device comprising:
processing circuitry including a memory and a processor:
the memory configured to store a first numerology parameter, Pn1 and a first timing adjustment parameter, Pt1; and
the processor configured to:
obtain at least a first numerology parameter, Pn1, associated with the numerology of an uplink signal transmitted by the wireless device;
determine at least a first timing adjustment parameter, Pt1, related to an amount of transit timing adjustment to be applied by the wireless device for transmitting uplink signals, Pt1 being associated with Pn1; and
apply the determined Pt1 to adjust the uplink transmit timing of the uplink signals to be transmitted by the wireless device.

Embodiment 7. The wireless device of Embodiment 6, further comprising a transmitter configured to transmit the uplink signals according to the adjusted uplink transmit timing.

Embodiment 8. The wireless device of Embodiment 6, wherein the uplink transmit timing adjustment is based on at least one of a characteristic of an uplink signal, a characteristic of a downlink signal and numerology parameters.

Embodiment 9. A method in a network node for adjusting timing of uplink transmissions of a wireless device, the method comprising:
determining a numerology used by the wireless device for transmitting uplink signals;
obtaining at least a first timing adjustment parameter, Pt1, associated with the determined numerology used for transmitting the signals;
transmitting the determined value of Pt1 to the wireless device.

Embodiment 10. The method of Embodiment 9, further comprising, receiving uplink signals from the wireless device according to transmit timing of the wireless device based on Pt1.

Embodiment 11. A network node for adjusting timing of uplink transmissions of a wireless device, the network node comprising:
processing circuitry including a memory and a processor:
the memory configured to store a first timing adjustment parameter, Pt1; and
the processor configured to:
determine a numerology used by the wireless device for transmitting uplink signals;
obtain at least a first timing adjustment parameter (Pt1) associated with the determined numerology used for transmitting the signals;
a transmitter configured to transmit the determined value of Pt1 to the wireless device.

Embodiment 12. The network node of Embodiment 11, further comprising a receiver configured to receive uplink signals from the wireless device according to transmit timing of the wireless device based on Pt1.

Embodiment 13. A wireless device configured to adjust a timing of transmissions of the wireless device, the wireless device comprising:
a numerology determiner module configured to obtain at least a first numerology parameter, Pn1, associated with the numerology of uplink signal transmitted by the wireless device;
a timing adjustment determiner module configured to determine at least a first timing adjustment parameter, Pt1, related to an amount of transit timing adjustment to be applied by the wireless device for transmitting uplink signals, Pt1 being associated with Pn1; and
a timing adjustment module configured to apply the determined Pt1 to adjust the uplink transmit timing of the uplink signals to be transmitted by the wireless device.

Embodiment 14. A network node for adjusting timing of uplink transmissions of a wireless device, the network node comprising:
a memory module configured to store a first timing adjustment parameter, Pt1; and
a numerology determiner module configured to determine a numerology used by the wireless device for transmitting uplink signals;
a timing adjustment parameter determiner module configured to obtain at least a first timing adjustment parameter (Pt1) associated with the determined numerology used for transmitting the signals;
a transmitter module configured to transmit the determined value of Pt1 to the wireless device.

Some further embodiments include:

Embodiment 15. A wireless device, comprising:
processing circuitry configured to:
determine at least one autonomous timing adjustment parameter based on at least one numerology parameter; and
transmit signals using the at least one autonomous timing adjustment parameter.

Embodiment 16. The wireless device of embodiment 15, wherein the at least one numerology parameter is a maximum adjustment amount of one adjustment step.

Embodiment 17. The wireless device of embodiment 16, wherein the maximum adjustment amount of one adjustment step is based on subcarrier spacing.

Embodiment 18. The wireless device of embodiment 15, wherein the at least one numerology parameter is a frequency of a timing adjustment.

Embodiment 19. The wireless device of embodiment 18, wherein the frequency of the timing adjustment is based on a carrier frequency of the UL signals.

Embodiment 20. The wireless device of embodiment 15, wherein the at least one numerology parameter is an aggregate adjustment rate at which the wireless device updates an uplink transmission timing.

Embodiment 21. The wireless device of embodiment 20, wherein the aggregate adjustment rate is based on subcarrier spacing.

Embodiment 22. The wireless device of embodiment 15, wherein the at least one numerology parameter is a timing error limit.

Embodiment 23. The wireless device of embodiment 22, wherein the timing error limit is based on the numerology.

Embodiment 24. The wireless device of embodiment 22, wherein the timing error limit is based on the uplink bandwidth.

Embodiment 25. The wireless device of embodiment 15, wherein the at least one numerology parameter is based on a numerology of at least one downlink signal received by the wireless device.

Embodiment 26. The wireless device of embodiment 25, wherein the at least one numerology parameter is based on the DL subcarrier spacing and UL subcarrier spacing.

Embodiment 27. The wireless device of embodiment 15, wherein the at least one numerology parameter is a function of at least one of uplink signals, downlink signals and a plurality of different numerology parameters associated with different numerologies.

Embodiment 28. A method, comprising:
determining at least one autonomous timing adjustment parameter based on at least one numerology parameter; and
transmitting signals using the at least one autonomous timing adjustment parameter.

Embodiment 29. The method of embodiment 28, wherein the at least one numerology parameter is a maximum adjustment amount of one adjustment step.

Embodiment 30. The method of embodiment 29, wherein the maximum adjustment amount of one adjustment step is based on subcarrier spacing.

Embodiment 31. The method of embodiment 28, wherein the at least one numerology parameter is a frequency of a timing adjustment.

Embodiment 32. The method of embodiment 31, wherein the frequency of the timing adjustment is based on a carrier frequency of the UL signals.

Embodiment 33. The method of embodiment 28, wherein the at least one numerology parameter is an aggregate adjustment rate at which the wireless device updates an uplink transmission timing.

Embodiment 34. The method of embodiment 33, wherein the aggregate adjustment rate is based on subcarrier spacing.

Embodiment 35. The method of embodiment 28, wherein the at least one numerology parameter is a timing error limit.

Embodiment 36. The method of embodiment 35, wherein the timing error limit is based on the numerology.

Embodiment 37. The method of embodiment 35, wherein the timing error limit is based on an uplink bandwidth.

Embodiment 38. The method of embodiment 28, wherein the at least one numerology parameter is based on a numerology of at least one downlink signal received by the wireless device.

Embodiment 39. The method of embodiment 38, wherein the at least one numerology parameter is based on the DL subcarrier spacing and UL subcarrier spacing.

Embodiment 40. The wireless device of embodiment 28, wherein the at least one numerology parameter is a function of at least one of uplink signals, downlink signals and a plurality of different numerology parameters associated with different numerologies.

Embodiment 41. A wireless device, comprising:
a processing module configured to:
determine at least one autonomous timing adjustment parameter based on at least one numerology parameter; and
transmit signals using the at least one autonomous timing adjustment parameter.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings, which are limited only by the scope of the claims.

What is claimed is:

1. A method in a wireless device of adjusting timing of transmissions, the method comprising:
   determining at least a first timing adjustment parameter based at least on:
   a timing of a downlink signal; and
   a first numerology parameter of a first numerology configured for uplink signaling; and
   transmitting an uplink transmission based at least on the determined first timing adjustment parameter.

2. The method of claim 1, wherein the at least the first timing adjustment parameter includes a maximum adjustment amount of one adjustment step based on a subcarrier spacing.

3. The method of claim 1, wherein the at least the first timing adjustment parameter includes a frequency of a timing adjustment based on a carrier frequency of the uplink transmission.

4. The method of claim 1, wherein at least the first timing adjustment parameter includes an aggregate adjustment rate at which the wireless device updates an uplink transmission timing.

5. The method of claim 1, further comprising:
   determining a second timing adjustment parameter based on a second numerology parameter;
   determining a numerology to be used by the wireless device for uplink transmissions;
   selecting one of the first timing adjustment parameter and the second timing adjustment parameter based on the determined numerology; and
   applying the selected one of the first and second timing adjustment parameters to adjust the timing of an uplink transmission.

6. The method of claim 5, wherein the second timing adjustment parameter is based on a determined downlink numerology.

7. The method of claim 5, wherein at least one of the first and second numerology parameter comprises one or more of: frame duration, subframe duration, transmission time interval (TTI) duration, slot duration, symbol duration and number of symbols per slot and subframe, subcarrier spacing, sampling frequency, fast Fourier transform (FFT) size, number of subcarriers per resource Block (RB), number of RBs within the bandwidth, and cyclic prefix length.

8. The method of claim 1, wherein the at least the first timing adjustment parameter is determined autonomously by the wireless device.

9. The method of claim 1, wherein the at least the first timing adjustment parameter is determined based on one of a rule and a predefined value received from a network node.

10. The method of claim 1, wherein the at least the first timing adjustment parameter is further determined based on one of an uplink bandwidth and a downlink bandwidth.

11. A wireless device configured for adjusting timing of transmissions, the wireless device comprising:
processing circuitry configured to:
determine at least a first timing adjustment parameter based at least on:
a timing of a downlink signal;
a first numerology parameter of a first numerology configured for uplink signaling; and
transmit an uplink transmission based at least on the determined first timing adjustment parameter.

12. The wireless device of claim 11, wherein the at least the first timing adjustment parameter includes a maximum adjustment amount of one adjustment step.

13. The wireless device of claim 11, wherein the at least the first timing adjustment parameter includes a frequency of a timing adjustment.

14. The wireless device of claim 11, wherein the at least the first timing adjustment parameter includes an aggregate adjustment rate at which the wireless device updates an uplink transmission timing.

15. The wireless device of claim 11, wherein the processing circuitry is further configured to:
determine a second timing adjustment parameter based on a second numerology parameter;
determine a numerology to be used by the wireless device for uplink transmissions;
select one of the first timing adjustment parameter and the second timing adjustment parameter based on the determined numerology; and
apply the selected one of the first and second timing adjustment parameters to adjust the timing of an uplink transmission.

16. The wireless device of claim 15, wherein the second timing adjustment parameter is based on a determined downlink numerology.

17. The wireless device of claim 15, wherein at least one of the first and second numerology parameter comprises one or more of: frame duration, subframe duration, transmission time interval (TTI) duration, slot duration, symbol duration and number of symbols per slot and subframe, subcarrier spacing, sampling frequency, fast Fourier transform (FFT) size, number of subcarriers per resource Block (RB), number of RBs within the bandwidth, and cyclic prefix length.

18. The wireless device of claim 11, wherein the at least the first timing adjustment parameter is determined autonomously by the wireless device.

19. The wireless device of claim 11, wherein the at least the first timing adjustment parameter is determined based on one of a rule and a predefined value received from a network node.

20. A method in a network node, the method comprising:
determining at least a first timing adjustment parameter based at least on:
a timing of an uplink signal; and
a first numerology parameter of a first numerology configured for uplink signaling, the first timing adjustment parameter related to an amount of transmit timing adjustment to be applied by a wireless device for transmitting an uplink signal; and
adapting at least one parameter of a receiver of the network node based on the determined at least one first timing adjustment parameter.

* * * * *